(12) United States Patent
Neves et al.

(10) Patent No.: US 11,971,908 B2
(45) Date of Patent: Apr. 30, 2024

(54) METHOD AND APPARATUS FOR DETECTING ANOMALIES IN COMMUNICATION DATA

(71) Applicant: Talkdesk, Inc., San Francisco, CA (US)

(72) Inventors: Pedro Filipe Caldeira Neves, Arganil (PT); Nuno André de Matos Lopes Cardoso, Coimbra (PT)

(73) Assignee: Talkdesk, Inc., San Francisco, CA (US)

( * ) Notice: Subject to any disclaimer, the term of this patent is extended or adjusted under 35 U.S.C. 154(b) by 0 days.

(21) Appl. No.: 17/843,111

(22) Filed: Jun. 17, 2022

(65) Prior Publication Data

US 2023/0409606 A1   Dec. 21, 2023

(51) Int. Cl.
*G06F 16/28* (2019.01)
*G06F 16/22* (2019.01)

(52) U.S. Cl.
CPC ........ *G06F 16/285* (2019.01); *G06F 16/2282* (2019.01)

(58) Field of Classification Search
CPC ............. H04L 63/1416; H04L 63/1425; G06F 16/285; G06F 16/906; G06F 21/552; G06F 11/3476; G06F 11/3466
See application file for complete search history.

(56) References Cited

U.S. PATENT DOCUMENTS

| | | | |
|---|---|---|---|
| 5,343,518 A | 8/1994 | Kneipp | |
| 5,570,419 A | 10/1996 | Cave et al. | |
| 5,862,203 A | 1/1999 | Wulkan et al. | |
| 5,897,616 A | 4/1999 | Kanevsky et al. | |
| 5,966,691 A | 10/1999 | Kibre et al. | |
| 5,970,124 A | 10/1999 | Csaszar et al. | |
| 6,100,891 A | 8/2000 | Thorne | |
| 6,128,415 A | 10/2000 | Hultgren et al. | |
| 6,163,607 A | 12/2000 | Bogart et al. | |
| 6,230,197 B1 | 5/2001 | Beck et al. | |
| 6,263,057 B1 | 7/2001 | Silverman | |
| 6,263,065 B1 | 7/2001 | Durinovic-Johri et al. | |
| 6,345,093 B1 | 2/2002 | Lee et al. | |

(Continued)

FOREIGN PATENT DOCUMENTS

| | | |
|---|---|---|
| EP | 1 418 519 A1 | 5/2004 |
| JP | 5986065 B2 | 9/2016 |

(Continued)

OTHER PUBLICATIONS

Aksin et al., "The Modern Call Center: A Multi-Disciplinary Perspective on Operations Management Research", Production and Operations Management, 2007, vol. 16, No. 6, pp. 665-688.

(Continued)

*Primary Examiner* — Robert W Beausoliel, Jr.
*Assistant Examiner* — Cheryl M Shechtman
(74) *Attorney, Agent, or Firm* — Rimon PC; Marc S. Kaufman

(57) ABSTRACT

A method and system for determining anomalies in call center communications. Data relating to communications is streamed and processed to obtain baseline probability distributions over various domains of communications. Streams related to subsequent calls are compared to the baselines to determine anomalies.

10 Claims, 7 Drawing Sheets

(56) References Cited

U.S. PATENT DOCUMENTS

| | | |
|---|---|---|
| 6,373,938 B1 | 4/2002 | Palacios et al. |
| 6,377,944 B1 | 4/2002 | Busey et al. |
| 6,385,584 B1 | 5/2002 | McAlister et al. |
| 6,411,687 B1 | 6/2002 | Bohacek et al. |
| 6,493,695 B1 | 12/2002 | Pickering et al. |
| 6,560,222 B1 | 5/2003 | Pounds et al. |
| 6,587,831 B1 | 7/2003 | O'Brien |
| 6,639,982 B1 | 10/2003 | Stuart et al. |
| 6,721,416 B1 | 4/2004 | Farrell |
| 6,754,333 B1 | 6/2004 | Flockhart et al. |
| 6,859,776 B1 | 2/2005 | Cohen et al. |
| 6,970,829 B1 | 11/2005 | Leamon |
| 7,023,979 B1 | 4/2006 | Wu et al. |
| 7,076,047 B1 | 7/2006 | Brennan et al. |
| 7,110,525 B1 | 9/2006 | Heller et al. |
| 7,209,475 B1 | 4/2007 | Shaffer et al. |
| 7,274,787 B1 | 9/2007 | Schoeneberger |
| 7,292,689 B2 | 11/2007 | Odinak et al. |
| 7,343,406 B1 | 3/2008 | Buonanno et al. |
| 7,372,952 B1 | 5/2008 | Wu et al. |
| 7,382,773 B2 | 6/2008 | Schoeneberger et al. |
| 7,409,336 B2 | 8/2008 | Pak et al. |
| 7,426,268 B2 | 9/2008 | Walker et al. |
| 7,466,334 B1 | 12/2008 | Baba |
| 7,478,051 B2 | 1/2009 | Nourbakhsh et al. |
| 7,537,154 B2 | 5/2009 | Ramachandran |
| 7,634,422 B1 | 12/2009 | Andre et al. |
| 7,657,263 B1 | 2/2010 | Chahrouri |
| 7,664,641 B1 | 2/2010 | Pettay et al. |
| 7,672,746 B1 | 3/2010 | Hamilton et al. |
| 7,672,845 B2 | 3/2010 | Beranek et al. |
| 7,676,034 B1 | 3/2010 | Wu et al. |
| 7,698,163 B2 | 4/2010 | Reed et al. |
| 7,752,159 B2 | 7/2010 | Nelken et al. |
| 7,774,790 B1 | 8/2010 | Jirman et al. |
| 7,788,286 B2 | 8/2010 | Nourbakhsh et al. |
| 7,853,006 B1 | 12/2010 | Fama et al. |
| 7,864,946 B1 | 1/2011 | Fama et al. |
| 7,869,998 B1 | 1/2011 | Di Fabbrizio et al. |
| 7,949,123 B1 | 5/2011 | Flockhart et al. |
| 7,953,219 B2 | 5/2011 | Freedman et al. |
| 7,966,187 B1 | 6/2011 | Pettay et al. |
| 7,966,369 B1 | 6/2011 | Briere et al. |
| 8,060,394 B2 | 11/2011 | Woodings et al. |
| 8,073,129 B1 | 12/2011 | Kalavar |
| 8,116,446 B1 | 2/2012 | Kalavar |
| 8,135,125 B2 | 3/2012 | Sidhu et al. |
| 8,160,233 B2 | 4/2012 | Keren et al. |
| 8,184,782 B1 | 5/2012 | Vatland et al. |
| 8,223,951 B1 | 7/2012 | Edelhaus et al. |
| 8,229,761 B2 | 7/2012 | Backhaus et al. |
| 8,243,896 B1 | 8/2012 | Rae |
| 8,300,798 B1 | 10/2012 | Wu et al. |
| 8,335,704 B2 | 12/2012 | Trefler et al. |
| 8,369,338 B1 | 2/2013 | Peng et al. |
| 8,370,155 B2 | 2/2013 | Byrd et al. |
| 8,391,466 B1 | 3/2013 | Noble, Jr. |
| 8,447,279 B1 | 5/2013 | Peng et al. |
| 8,488,769 B1 | 7/2013 | Noble et al. |
| 8,526,576 B1 | 9/2013 | Deich et al. |
| 8,535,059 B1 | 9/2013 | Noble, Jr. et al. |
| 8,583,466 B2 | 11/2013 | Margulies et al. |
| 8,594,306 B2 | 11/2013 | Laredo et al. |
| 8,626,137 B1 | 1/2014 | Devitt et al. |
| 8,635,226 B2 | 1/2014 | Chang et al. |
| 8,644,489 B1 | 2/2014 | Noble et al. |
| 8,671,020 B1 | 3/2014 | Morrison et al. |
| 8,688,557 B1 | 4/2014 | Rose et al. |
| 8,738,739 B2 | 5/2014 | Makar et al. |
| 8,767,948 B1 | 7/2014 | Riahi et al. |
| 8,811,597 B1 | 8/2014 | Hackbarth et al. |
| 8,861,691 B1 | 10/2014 | De et al. |
| 8,869,245 B2 | 10/2014 | Ranganathan et al. |
| 8,898,219 B2 | 11/2014 | Ricci |
| 8,898,290 B2 | 11/2014 | Siemsgluess |
| 8,909,693 B2 | 12/2014 | Frissora et al. |
| 8,935,172 B1 | 1/2015 | Noble, Jr. et al. |
| 8,995,648 B1 | 3/2015 | Gibbs et al. |
| 8,996,509 B1 | 3/2015 | Sundaram |
| 9,020,142 B2 | 4/2015 | Kosiba et al. |
| 9,026,431 B1 | 5/2015 | Moreno Mengibar et al. |
| 9,060,057 B1 | 6/2015 | Danis |
| 9,065,915 B1 | 6/2015 | Lillard et al. |
| 9,082,094 B1 | 7/2015 | Etter et al. |
| 9,100,483 B1 | 8/2015 | Snedden |
| 9,117,450 B2 | 8/2015 | Cook et al. |
| 9,123,009 B1 | 9/2015 | Etter et al. |
| 9,137,366 B2 | 9/2015 | Medina et al. |
| 9,152,737 B1 | 10/2015 | Micali et al. |
| 9,160,853 B1 | 10/2015 | Daddi et al. |
| 9,178,999 B1 | 11/2015 | Hegde et al. |
| 9,185,222 B1 | 11/2015 | Govindarajan et al. |
| 9,237,232 B1 | 1/2016 | Williams et al. |
| 9,280,754 B1 | 3/2016 | Schwartz et al. |
| 9,286,413 B1 | 3/2016 | Coates et al. |
| 9,300,801 B1 | 3/2016 | Warford et al. |
| 9,317,825 B2 | 4/2016 | Defusco et al. |
| 9,319,524 B1 | 4/2016 | Webster |
| 9,386,152 B2 | 7/2016 | Riahi et al. |
| 9,397,985 B1 | 7/2016 | Seger et al. |
| 9,426,291 B1 | 8/2016 | Ouimette et al. |
| 9,473,637 B1 | 10/2016 | Venkatapathy et al. |
| 9,514,463 B2 | 12/2016 | Grigg et al. |
| 9,595,049 B2 | 3/2017 | Showers et al. |
| 9,602,665 B1 | 3/2017 | Koster |
| 9,609,131 B2 | 3/2017 | Placiakis et al. |
| 9,674,361 B2 | 6/2017 | Ristock et al. |
| 9,679,265 B1 | 6/2017 | Schwartz et al. |
| 9,774,731 B1 | 9/2017 | Haltom et al. |
| 9,787,840 B1 | 10/2017 | Neuer, III et al. |
| 9,813,495 B1 | 11/2017 | Van et al. |
| 9,813,559 B1 | 11/2017 | Noble et al. |
| 9,823,949 B2 | 11/2017 | Ristock et al. |
| 9,883,037 B1 | 1/2018 | Lewis et al. |
| 9,894,478 B1 | 2/2018 | Deluca et al. |
| 9,930,181 B1 | 3/2018 | Moran et al. |
| 9,955,021 B1 | 4/2018 | Liu et al. |
| RE46,852 E | 5/2018 | Petrovykh |
| 9,998,596 B1 | 6/2018 | Dunmire et al. |
| 10,009,465 B1 | 6/2018 | Fang et al. |
| 10,038,788 B1 | 7/2018 | Khalatian |
| 10,044,862 B1 | 8/2018 | Cai et al. |
| 10,079,939 B1 | 9/2018 | Bostick et al. |
| 10,085,073 B2 | 9/2018 | Ray et al. |
| 10,101,974 B2 | 10/2018 | Ristock et al. |
| 10,115,065 B1 | 10/2018 | Fama et al. |
| 10,135,973 B2 | 11/2018 | Algard et al. |
| 10,154,138 B2 | 12/2018 | Te Booij et al. |
| 10,194,027 B1 | 1/2019 | Daddi et al. |
| 10,235,999 B1 | 3/2019 | Naughton et al. |
| 10,241,752 B2 | 3/2019 | Lemay et al. |
| 10,242,019 B1 | 3/2019 | Shan et al. |
| 10,276,170 B2 | 4/2019 | Gruber et al. |
| 10,277,745 B1 | 4/2019 | Araujo et al. |
| 10,290,017 B2 | 5/2019 | Traasdahl et al. |
| 10,331,402 B1 | 6/2019 | Spector et al. |
| 10,354,677 B2 | 7/2019 | Mohamed et al. |
| 10,380,246 B2 | 8/2019 | Clark et al. |
| 10,440,180 B1 | 10/2019 | Jayapalan et al. |
| 10,445,742 B2 | 10/2019 | Prendki et al. |
| 10,460,728 B2 | 10/2019 | Anbazhagan et al. |
| 10,497,361 B1 | 12/2019 | Rule et al. |
| 10,554,590 B2 | 2/2020 | Cabrera-Cordon et al. |
| 10,554,817 B1 | 2/2020 | Sullivan et al. |
| 10,572,879 B1 | 2/2020 | Hunter et al. |
| 10,574,822 B1 | 2/2020 | Sheshaiahgari et al. |
| 10,601,992 B2 | 3/2020 | Dwyer et al. |
| 10,623,572 B1 | 4/2020 | Copeland |
| 10,635,973 B1 | 4/2020 | Dirac et al. |
| 10,636,425 B2 | 4/2020 | Naughton et al. |
| 10,699,303 B2 | 6/2020 | Ismail et al. |
| 10,715,648 B1 | 7/2020 | Vashisht et al. |
| 10,718,031 B1 | 7/2020 | Wu et al. |
| 10,728,384 B1 | 7/2020 | Channakeshava et al. |

(56) References Cited

U.S. PATENT DOCUMENTS

| | | |
|---|---|---|
| 10,735,586 B1 | 8/2020 | Johnston |
| 10,742,806 B2 | 8/2020 | Kotak |
| 10,750,019 B1 | 8/2020 | Petrovykh et al. |
| 10,783,568 B1 | 9/2020 | Chandra et al. |
| 10,789,956 B1 | 9/2020 | Dube |
| 10,803,865 B2 | 10/2020 | Naughton et al. |
| 10,812,654 B2 | 10/2020 | Wozniak |
| 10,812,655 B1 | 10/2020 | Adibi et al. |
| 10,827,069 B1 | 11/2020 | Paiva |
| 10,827,071 B1 | 11/2020 | Adibi et al. |
| 10,839,432 B1 | 11/2020 | Konig et al. |
| 10,841,425 B1 | 11/2020 | Langley et al. |
| 10,855,844 B1 | 12/2020 | Smith et al. |
| 10,861,031 B2 | 12/2020 | Sullivan et al. |
| 10,878,479 B2 | 12/2020 | Wu et al. |
| 10,923,127 B2 | 2/2021 | Mckenzie et al. |
| 10,929,796 B1 | 2/2021 | Stepanov |
| 10,943,589 B2 | 3/2021 | Naughton et al. |
| 10,970,682 B1 | 4/2021 | Aykin |
| 11,017,176 B2 | 5/2021 | Ayers et al. |
| 11,089,158 B1 | 8/2021 | Holland et al. |
| 11,417,343 B2 | 8/2022 | Cohen et al. |
| 11,425,252 B1 | 8/2022 | Martin et al. |
| 2001/0008999 A1 | 7/2001 | Bull |
| 2001/0024497 A1 | 9/2001 | Campbell |
| 2001/0054072 A1 | 12/2001 | Discolo et al. |
| 2002/0019737 A1 | 2/2002 | Stuart et al. |
| 2002/0029272 A1 | 3/2002 | Weller |
| 2002/0034304 A1 | 3/2002 | Yang |
| 2002/0038420 A1 | 3/2002 | Collins et al. |
| 2002/0067823 A1 | 6/2002 | Walker et al. |
| 2002/0143599 A1 | 10/2002 | Nourbakhsh et al. |
| 2002/0169664 A1 | 11/2002 | Walker et al. |
| 2002/0174182 A1 | 11/2002 | Wilkinson et al. |
| 2002/0181689 A1 | 12/2002 | Rupe et al. |
| 2003/0007621 A1 | 1/2003 | Graves et al. |
| 2003/0009520 A1 | 1/2003 | Nourbakhsh et al. |
| 2003/0032409 A1 | 2/2003 | Hutcheson et al. |
| 2003/0061068 A1 | 3/2003 | Curtis |
| 2003/0112927 A1 | 6/2003 | Brown et al. |
| 2003/0126136 A1 | 7/2003 | Omoigui |
| 2003/0154072 A1 | 8/2003 | Young et al. |
| 2003/0167167 A1 | 9/2003 | Gong |
| 2004/0044585 A1 | 3/2004 | Franco |
| 2004/0044664 A1 | 3/2004 | Cash et al. |
| 2004/0062364 A1 | 4/2004 | Dezonno et al. |
| 2004/0078257 A1 | 4/2004 | Schweitzer et al. |
| 2004/0098274 A1 | 5/2004 | Dezonno et al. |
| 2004/0103051 A1 | 5/2004 | Reed et al. |
| 2004/0141508 A1 | 7/2004 | Schoeneberger et al. |
| 2004/0162724 A1 | 8/2004 | Hill et al. |
| 2004/0162753 A1 | 8/2004 | Vogel et al. |
| 2004/0174980 A1 | 9/2004 | Knott et al. |
| 2004/0215451 A1 | 10/2004 | MacLeod |
| 2005/0033957 A1 | 2/2005 | Enokida |
| 2005/0043986 A1 | 2/2005 | Mcconnell et al. |
| 2005/0063365 A1 | 3/2005 | Mathew et al. |
| 2005/0065837 A1 | 3/2005 | Kosiba et al. |
| 2005/0071178 A1 | 3/2005 | Beckstrom et al. |
| 2005/0105712 A1 | 5/2005 | Williams et al. |
| 2005/0177368 A1 | 8/2005 | Odinak et al. |
| 2005/0226220 A1 | 10/2005 | Kilkki et al. |
| 2005/0228774 A1 | 10/2005 | Ronnewinkel |
| 2005/0246511 A1 | 11/2005 | Willman et al. |
| 2005/0271198 A1 | 12/2005 | Chin et al. |
| 2006/0095575 A1 | 5/2006 | Sureka et al. |
| 2006/0126818 A1 | 6/2006 | Berger et al. |
| 2006/0153357 A1 | 7/2006 | Acharya et al. |
| 2006/0166669 A1 | 7/2006 | Claussen |
| 2006/0173724 A1 | 8/2006 | Trefler et al. |
| 2006/0188086 A1 | 8/2006 | Busey et al. |
| 2006/0209797 A1 | 9/2006 | Anisimov et al. |
| 2006/0215831 A1 | 9/2006 | Knott et al. |
| 2006/0229931 A1 | 10/2006 | Fligler et al. |
| 2006/0256953 A1 | 11/2006 | Pulaski et al. |
| 2006/0271361 A1 | 11/2006 | Vora et al. |
| 2006/0274856 A1 | 12/2006 | Dun et al. |
| 2006/0277108 A1 | 12/2006 | Altberg et al. |
| 2007/0011153 A1 | 1/2007 | Pillai et al. |
| 2007/0016565 A1 | 1/2007 | Evans et al. |
| 2007/0036334 A1 | 2/2007 | Culbertson et al. |
| 2007/0038499 A1 | 2/2007 | Margulies et al. |
| 2007/0041519 A1 | 2/2007 | Erhart et al. |
| 2007/0061183 A1 | 3/2007 | Seetharaman et al. |
| 2007/0078725 A1 | 4/2007 | Koszewski et al. |
| 2007/0121894 A1 | 5/2007 | Noble |
| 2007/0121902 A1 | 5/2007 | Stoica et al. |
| 2007/0121903 A1 | 5/2007 | Moore, Jr. et al. |
| 2007/0133760 A1 | 6/2007 | Cotignola et al. |
| 2007/0136284 A1 | 6/2007 | Cobb et al. |
| 2007/0155411 A1 | 7/2007 | Morrison |
| 2007/0157021 A1 | 7/2007 | Whitfield |
| 2007/0160188 A1 | 7/2007 | Sharpe et al. |
| 2007/0162296 A1 | 7/2007 | Altberg et al. |
| 2007/0198329 A1 | 8/2007 | Lyerly et al. |
| 2007/0201636 A1 | 8/2007 | Gilbert et al. |
| 2007/0211881 A1 | 9/2007 | Parker-Stephen |
| 2007/0263810 A1 | 11/2007 | Sterns |
| 2007/0265990 A1 | 11/2007 | Sidhu et al. |
| 2007/0269031 A1 | 11/2007 | Honig et al. |
| 2007/0280460 A1 | 12/2007 | Harris et al. |
| 2007/0287430 A1 | 12/2007 | Hosain et al. |
| 2008/0002823 A1 | 1/2008 | Fama et al. |
| 2008/0004933 A1 | 1/2008 | Gillespie |
| 2008/0043976 A1 | 2/2008 | Maximo et al. |
| 2008/0065902 A1 | 3/2008 | Spohrer et al. |
| 2008/0095355 A1 | 4/2008 | Mahalaha et al. |
| 2008/0115213 A1* | 5/2008 | Bhatt .................. G06F 21/316 726/22 |
| 2008/0126957 A1 | 5/2008 | Tysowski et al. |
| 2008/0205620 A1 | 8/2008 | Odinak et al. |
| 2008/0225872 A1 | 9/2008 | Collins et al. |
| 2008/0254774 A1 | 10/2008 | Lee |
| 2008/0255944 A1 | 10/2008 | Shah et al. |
| 2008/0260138 A1 | 10/2008 | Chen et al. |
| 2008/0288770 A1 | 11/2008 | Kline et al. |
| 2008/0300955 A1 | 12/2008 | Hamilton et al. |
| 2009/0018996 A1 | 1/2009 | Hunt et al. |
| 2009/0080411 A1 | 3/2009 | Lyman |
| 2009/0086945 A1 | 4/2009 | Buchanan et al. |
| 2009/0086949 A1 | 4/2009 | Caspi et al. |
| 2009/0086953 A1 | 4/2009 | Vendrow |
| 2009/0110182 A1 | 4/2009 | Knight, Jr. et al. |
| 2009/0171164 A1 | 7/2009 | Jung et al. |
| 2009/0222551 A1 | 9/2009 | Neely et al. |
| 2009/0228264 A1 | 9/2009 | Williams et al. |
| 2009/0234710 A1 | 9/2009 | Belgaied et al. |
| 2009/0234732 A1 | 9/2009 | Zorman et al. |
| 2009/0245479 A1 | 10/2009 | Surendran |
| 2009/0285384 A1 | 11/2009 | Pollock et al. |
| 2009/0306981 A1 | 12/2009 | Cromack et al. |
| 2009/0307052 A1 | 12/2009 | Mankani et al. |
| 2010/0106568 A1 | 4/2010 | Grimes |
| 2010/0114645 A1 | 5/2010 | Hamilton et al. |
| 2010/0114646 A1 | 5/2010 | Mcilwain et al. |
| 2010/0165977 A1 | 7/2010 | Mccord |
| 2010/0189249 A1 | 7/2010 | Shah et al. |
| 2010/0189250 A1 | 7/2010 | Williams et al. |
| 2010/0211515 A1 | 8/2010 | Woodings et al. |
| 2010/0235341 A1 | 9/2010 | Bennett |
| 2010/0250196 A1 | 9/2010 | Lawler et al. |
| 2010/0262549 A1 | 10/2010 | Kannan et al. |
| 2010/0266115 A1 | 10/2010 | Fedorov et al. |
| 2010/0266116 A1 | 10/2010 | Stolyar et al. |
| 2010/0274618 A1 | 10/2010 | Byrd et al. |
| 2010/0287131 A1 | 11/2010 | Church |
| 2010/0293033 A1 | 11/2010 | Hall et al. |
| 2010/0299268 A1 | 11/2010 | Guha et al. |
| 2010/0332287 A1 | 12/2010 | Gates et al. |
| 2011/0014932 A1 | 1/2011 | Estevez |
| 2011/0022461 A1 | 1/2011 | Simeonov |
| 2011/0071870 A1 | 3/2011 | Gong |
| 2011/0077994 A1 | 3/2011 | Segev et al. |
| 2011/0082688 A1 | 4/2011 | Kim et al. |

(56) References Cited

U.S. PATENT DOCUMENTS

| | | |
|---|---|---|
| 2011/0116618 A1 | 5/2011 | Zyarko et al. |
| 2011/0125697 A1 | 5/2011 | Erhart et al. |
| 2011/0143323 A1 | 6/2011 | Cohen |
| 2011/0182283 A1 | 7/2011 | Van et al. |
| 2011/0185293 A1 | 7/2011 | Barnett et al. |
| 2011/0194684 A1 | 8/2011 | Ristock et al. |
| 2011/0216897 A1 | 9/2011 | Laredo et al. |
| 2011/0264581 A1 | 10/2011 | Clyne |
| 2011/0267985 A1 | 11/2011 | Wilkinson et al. |
| 2011/0286592 A1 | 11/2011 | Nimmagadda |
| 2011/0288897 A1 | 11/2011 | Erhart et al. |
| 2012/0046996 A1 | 2/2012 | Shah et al. |
| 2012/0051537 A1 | 3/2012 | Chishti et al. |
| 2012/0084217 A1 | 4/2012 | Kohler et al. |
| 2012/0087486 A1 | 4/2012 | Guerrero et al. |
| 2012/0095835 A1 | 4/2012 | Makar et al. |
| 2012/0109830 A1 | 5/2012 | Vogel |
| 2012/0257116 A1 | 10/2012 | Hendrickson et al. |
| 2012/0265587 A1 | 10/2012 | Kinkead |
| 2012/0290373 A1 | 11/2012 | Ferzacca et al. |
| 2012/0321073 A1 | 12/2012 | Flockhart et al. |
| 2013/0023235 A1 | 1/2013 | Fan et al. |
| 2013/0060587 A1 | 3/2013 | Bayrak et al. |
| 2013/0073361 A1 | 3/2013 | Silver |
| 2013/0085785 A1 | 4/2013 | Rogers et al. |
| 2013/0090963 A1 | 4/2013 | Sharma et al. |
| 2013/0124361 A1 | 5/2013 | Bryson |
| 2013/0136252 A1 | 5/2013 | Kosiba et al. |
| 2013/0223608 A1 | 8/2013 | Flockhart et al. |
| 2013/0223610 A1 | 8/2013 | Kohler et al. |
| 2013/0236002 A1 | 9/2013 | Jennings et al. |
| 2013/0257877 A1 | 10/2013 | Davis |
| 2013/0304581 A1 | 11/2013 | Soroca et al. |
| 2013/0325972 A1 | 12/2013 | Boston et al. |
| 2014/0012603 A1 | 1/2014 | Scanlon et al. |
| 2014/0016762 A1 | 1/2014 | Mitchell et al. |
| 2014/0039944 A1 | 2/2014 | Humbert et al. |
| 2014/0039962 A1 | 2/2014 | Nudd et al. |
| 2014/0067375 A1 | 3/2014 | Wooters |
| 2014/0079195 A1 | 3/2014 | Srivastava et al. |
| 2014/0079207 A1 | 3/2014 | Zhakov et al. |
| 2014/0099916 A1 | 4/2014 | Mallikarjunan et al. |
| 2014/0101261 A1 | 4/2014 | Wu et al. |
| 2014/0136346 A1 | 5/2014 | Teso |
| 2014/0140494 A1 | 5/2014 | Zhakov |
| 2014/0143018 A1 | 5/2014 | Nies et al. |
| 2014/0143249 A1 | 5/2014 | Cazzanti et al. |
| 2014/0161241 A1 | 6/2014 | Baranovsky et al. |
| 2014/0164502 A1 | 6/2014 | Khodorenko et al. |
| 2014/0177819 A1 | 6/2014 | Vymenets et al. |
| 2014/0188477 A1 | 7/2014 | Zhang |
| 2014/0200988 A1 | 7/2014 | Kassko et al. |
| 2014/0219132 A1 | 8/2014 | Delveaux et al. |
| 2014/0219438 A1 | 8/2014 | Brown et al. |
| 2014/0233719 A1 | 8/2014 | Vyemenets et al. |
| 2014/0244712 A1 | 8/2014 | Walters et al. |
| 2014/0254790 A1 | 9/2014 | Shaffer et al. |
| 2014/0257908 A1 | 9/2014 | Steiner et al. |
| 2014/0270108 A1 | 9/2014 | Riahi et al. |
| 2014/0270138 A1 | 9/2014 | Uba et al. |
| 2014/0270142 A1 | 9/2014 | Bischoff et al. |
| 2014/0270145 A1 | 9/2014 | Erhart et al. |
| 2014/0278605 A1 | 9/2014 | Borucki et al. |
| 2014/0278649 A1 | 9/2014 | Guerinik et al. |
| 2014/0279045 A1 | 9/2014 | Shottan et al. |
| 2014/0279050 A1 | 9/2014 | Makar et al. |
| 2014/0314225 A1 | 10/2014 | Riahi et al. |
| 2014/0335480 A1 | 11/2014 | Asenjo et al. |
| 2014/0372171 A1 | 12/2014 | Martin et al. |
| 2014/0379424 A1 | 12/2014 | Shroff |
| 2015/0006400 A1 | 1/2015 | Eng et al. |
| 2015/0010134 A1 | 1/2015 | Erel et al. |
| 2015/0012278 A1 | 1/2015 | Metcalf |
| 2015/0016600 A1 | 1/2015 | Desai et al. |
| 2015/0023484 A1 | 1/2015 | Ni et al. |
| 2015/0030151 A1 | 1/2015 | Bellini et al. |
| 2015/0030152 A1 | 1/2015 | Waxman et al. |
| 2015/0051957 A1 | 2/2015 | Griebeler et al. |
| 2015/0066632 A1 | 3/2015 | Gonzalez et al. |
| 2015/0071418 A1 | 3/2015 | Shaffer et al. |
| 2015/0078538 A1 | 3/2015 | Jain |
| 2015/0100473 A1 | 4/2015 | Manoharan et al. |
| 2015/0127400 A1 | 5/2015 | Chan et al. |
| 2015/0127441 A1 | 5/2015 | Feldman |
| 2015/0127677 A1 | 5/2015 | Wang et al. |
| 2015/0142704 A1 | 5/2015 | London |
| 2015/0172463 A1 | 6/2015 | Quast et al. |
| 2015/0178371 A1 | 6/2015 | Seth et al. |
| 2015/0195406 A1 | 7/2015 | Dwyer et al. |
| 2015/0213454 A1 | 7/2015 | Vedula |
| 2015/0215464 A1 | 7/2015 | Shaffer et al. |
| 2015/0222751 A1 | 8/2015 | Odinak et al. |
| 2015/0256677 A1 | 9/2015 | Konig et al. |
| 2015/0262188 A1 | 9/2015 | Franco |
| 2015/0262208 A1 | 9/2015 | Bjontegard et al. |
| 2015/0269377 A1 | 9/2015 | Gaddipati |
| 2015/0271334 A1 | 9/2015 | Wawrzynowicz |
| 2015/0281445 A1 | 10/2015 | Kumar et al. |
| 2015/0281449 A1 | 10/2015 | Milstein et al. |
| 2015/0281450 A1 | 10/2015 | Shapiro et al. |
| 2015/0281454 A1 | 10/2015 | Milstein et al. |
| 2015/0287410 A1 | 10/2015 | Mengibar et al. |
| 2015/0295788 A1 | 10/2015 | Witzman et al. |
| 2015/0296081 A1 | 10/2015 | Jeong |
| 2015/0302301 A1 | 10/2015 | Petersen |
| 2015/0334230 A1 | 11/2015 | Volzke |
| 2015/0339446 A1 | 11/2015 | Sperling et al. |
| 2015/0339620 A1 | 11/2015 | Esposito et al. |
| 2015/0339769 A1 | 11/2015 | Deoliveira et al. |
| 2015/0347900 A1 | 12/2015 | Bell et al. |
| 2015/0350429 A1 | 12/2015 | Kumar et al. |
| 2015/0350440 A1 | 12/2015 | Steiner et al. |
| 2015/0350442 A1 | 12/2015 | O'connor |
| 2015/0350443 A1 | 12/2015 | Kumar et al. |
| 2015/0379562 A1 | 12/2015 | Spievak et al. |
| 2016/0026629 A1 | 1/2016 | Clifford et al. |
| 2016/0034260 A1 | 2/2016 | Ristock et al. |
| 2016/0034995 A1 | 2/2016 | Williams et al. |
| 2016/0036981 A1 | 2/2016 | Hollenberg et al. |
| 2016/0036983 A1 | 2/2016 | Korolev et al. |
| 2016/0042419 A1 | 2/2016 | Singh |
| 2016/0042749 A1 | 2/2016 | Hirose |
| 2016/0055499 A1 | 2/2016 | Hawkins et al. |
| 2016/0057284 A1 | 2/2016 | Nagpal et al. |
| 2016/0065739 A1 | 3/2016 | Brimshan et al. |
| 2016/0080567 A1 | 3/2016 | Hooshiari et al. |
| 2016/0085891 A1 | 3/2016 | Ter et al. |
| 2016/0112867 A1 | 4/2016 | Martinez |
| 2016/0124937 A1 | 5/2016 | Elhaddad |
| 2016/0125456 A1 | 5/2016 | Wu et al. |
| 2016/0134624 A1 | 5/2016 | Jacobson et al. |
| 2016/0140627 A1 | 5/2016 | Moreau et al. |
| 2016/0150086 A1 | 5/2016 | Pickford |
| 2016/0155080 A1 | 6/2016 | Gnanasambandam et al. |
| 2016/0162478 A1 | 6/2016 | Blassin et al. |
| 2016/0171422 A1 | 6/2016 | Wicaksono et al. |
| 2016/0173692 A1 | 6/2016 | Wicaksono et al. |
| 2016/0180381 A1 | 6/2016 | Kaiser et al. |
| 2016/0191699 A1 | 6/2016 | Agrawal et al. |
| 2016/0191709 A1 | 6/2016 | Pullamplavil et al. |
| 2016/0191712 A1 | 6/2016 | Bouzid et al. |
| 2016/0234386 A1 | 8/2016 | Wawrzynowicz |
| 2016/0247165 A1 | 8/2016 | Ryabchun et al. |
| 2016/0261747 A1 | 8/2016 | Thirugnanasundaram et al. |
| 2016/0295018 A1 | 10/2016 | Loftus et al. |
| 2016/0295020 A1 | 10/2016 | Shaffer et al. |
| 2016/0300573 A1 | 10/2016 | Carbune et al. |
| 2016/0335576 A1 | 11/2016 | Peng |
| 2016/0349960 A1 | 12/2016 | Kumar et al. |
| 2016/0358611 A1 | 12/2016 | Abel |
| 2016/0360033 A1 | 12/2016 | Kocan |
| 2016/0360336 A1 | 12/2016 | Gross et al. |
| 2016/0378569 A1 | 12/2016 | Ristock et al. |
| 2016/0381222 A1 | 12/2016 | Ristock et al. |

(56) References Cited

U.S. PATENT DOCUMENTS

| | | |
|---|---|---|
| 2017/0004178 A1 | 1/2017 | Ponting et al. |
| 2017/0006135 A1 | 1/2017 | Siebel et al. |
| 2017/0006161 A9 | 1/2017 | Riahi et al. |
| 2017/0011311 A1 | 1/2017 | Backer et al. |
| 2017/0024762 A1 | 1/2017 | Swaminathan |
| 2017/0032436 A1 | 2/2017 | Disalvo et al. |
| 2017/0034226 A1 | 2/2017 | Bostick et al. |
| 2017/0068436 A1 | 3/2017 | Auer et al. |
| 2017/0068854 A1 | 3/2017 | Markiewicz et al. |
| 2017/0098197 A1 | 4/2017 | Yu et al. |
| 2017/0104875 A1 | 4/2017 | Im et al. |
| 2017/0111505 A1 | 4/2017 | Mcgann et al. |
| 2017/0111509 A1 | 4/2017 | McGann et al. |
| 2017/0116173 A1 | 4/2017 | Lev-Tov et al. |
| 2017/0118336 A1 | 4/2017 | Tapuhi et al. |
| 2017/0132536 A1 | 5/2017 | Goldstein et al. |
| 2017/0148073 A1 | 5/2017 | Nomula et al. |
| 2017/0155766 A1 | 6/2017 | Kumar et al. |
| 2017/0161439 A1 | 6/2017 | Raduchel et al. |
| 2017/0162197 A1 | 6/2017 | Cohen |
| 2017/0169325 A1 | 6/2017 | McCord et al. |
| 2017/0207916 A1 | 7/2017 | Luce et al. |
| 2017/0214795 A1 | 7/2017 | Charlson |
| 2017/0220966 A1 | 8/2017 | Wang |
| 2017/0223070 A1 | 8/2017 | Lin |
| 2017/0236512 A1 | 8/2017 | Williams et al. |
| 2017/0286774 A1 | 10/2017 | Gaidon |
| 2017/0288866 A1 | 10/2017 | Vanek et al. |
| 2017/0308794 A1 | 10/2017 | Fischerstrom |
| 2017/0316386 A1 | 11/2017 | Joshi et al. |
| 2017/0323344 A1 | 11/2017 | Nigul |
| 2017/0337578 A1 | 11/2017 | Chittilappilly et al. |
| 2017/0344754 A1 | 11/2017 | Kumar et al. |
| 2017/0344988 A1 | 11/2017 | Cusden et al. |
| 2017/0359421 A1 | 12/2017 | Stoops et al. |
| 2017/0372436 A1 | 12/2017 | Dalal et al. |
| 2018/0018705 A1 | 1/2018 | Tognetti |
| 2018/0032997 A1 | 2/2018 | Gordon et al. |
| 2018/0052664 A1 | 2/2018 | Zhang et al. |
| 2018/0053401 A1 | 2/2018 | Martin et al. |
| 2018/0054464 A1 | 2/2018 | Zhang et al. |
| 2018/0060830 A1 | 3/2018 | Abramovici et al. |
| 2018/0061256 A1 | 3/2018 | Elchik et al. |
| 2018/0077088 A1 | 3/2018 | Cabrera-Cordon et al. |
| 2018/0077250 A1 | 3/2018 | Prasad et al. |
| 2018/0083898 A1 | 3/2018 | Pham |
| 2018/0097910 A1 | 4/2018 | D'Agostino et al. |
| 2018/0114234 A1 | 4/2018 | Fighel |
| 2018/0121766 A1 | 5/2018 | Mccord et al. |
| 2018/0137472 A1 | 5/2018 | Gorzela et al. |
| 2018/0137555 A1 | 5/2018 | Clausse et al. |
| 2018/0146093 A1 | 5/2018 | Kumar et al. |
| 2018/0150749 A1 | 5/2018 | Wu et al. |
| 2018/0152558 A1 | 5/2018 | Chan et al. |
| 2018/0164259 A1 | 6/2018 | Liu et al. |
| 2018/0165062 A1 | 6/2018 | Yoo et al. |
| 2018/0165691 A1 | 6/2018 | Heater et al. |
| 2018/0165692 A1 | 6/2018 | McCoy |
| 2018/0165723 A1 | 6/2018 | Wright et al. |
| 2018/0174198 A1 | 6/2018 | Wilkinson et al. |
| 2018/0189273 A1 | 7/2018 | Campos et al. |
| 2018/0190144 A1 | 7/2018 | Corelli et al. |
| 2018/0198917 A1 | 7/2018 | Ristock et al. |
| 2018/0205825 A1 | 7/2018 | Vymenets et al. |
| 2018/0248818 A1 | 8/2018 | Zucker et al. |
| 2018/0248895 A1* | 8/2018 | Watson ................ H04L 63/083 |
| 2018/0260857 A1 | 9/2018 | Kar et al. |
| 2018/0285423 A1 | 10/2018 | Ciano et al. |
| 2018/0286000 A1 | 10/2018 | Berry et al. |
| 2018/0293327 A1 | 10/2018 | Miller et al. |
| 2018/0293532 A1 | 10/2018 | Singh et al. |
| 2018/0300295 A1 | 10/2018 | Maksak et al. |
| 2018/0300641 A1 | 10/2018 | Donn et al. |
| 2018/0308072 A1 | 10/2018 | Smith et al. |
| 2018/0309801 A1 | 10/2018 | Rathod |
| 2018/0349858 A1 | 12/2018 | Walker et al. |
| 2018/0361253 A1 | 12/2018 | Grosso |
| 2018/0365651 A1 | 12/2018 | Sreedhara et al. |
| 2018/0367672 A1 | 12/2018 | Ristock et al. |
| 2018/0372486 A1 | 12/2018 | Farniok et al. |
| 2018/0376002 A1 | 12/2018 | Abraham |
| 2019/0013017 A1 | 1/2019 | Kang et al. |
| 2019/0020757 A1* | 1/2019 | Rao .................. H04M 3/5175 |
| 2019/0028587 A1 | 1/2019 | Unitt et al. |
| 2019/0028588 A1 | 1/2019 | Shinseki et al. |
| 2019/0037077 A1 | 1/2019 | Konig et al. |
| 2019/0042988 A1 | 2/2019 | Brown et al. |
| 2019/0043106 A1 | 2/2019 | Talmor et al. |
| 2019/0058793 A1 | 2/2019 | Konig et al. |
| 2019/0104092 A1 | 4/2019 | Koohmarey et al. |
| 2019/0108834 A1 | 4/2019 | Nelson et al. |
| 2019/0124202 A1 | 4/2019 | Dubey et al. |
| 2019/0130329 A1 | 5/2019 | Fama et al. |
| 2019/0132443 A1 | 5/2019 | Munns et al. |
| 2019/0146647 A1 | 5/2019 | Ramachandran et al. |
| 2019/0147045 A1 | 5/2019 | Kim |
| 2019/0172291 A1 | 6/2019 | Naseath |
| 2019/0180095 A1 | 6/2019 | Ferguson et al. |
| 2019/0180747 A1 | 6/2019 | Back et al. |
| 2019/0182383 A1 | 6/2019 | Shaev et al. |
| 2019/0196676 A1 | 6/2019 | Hillis et al. |
| 2019/0197568 A1 | 6/2019 | Li et al. |
| 2019/0205389 A1 | 7/2019 | Tripathi et al. |
| 2019/0236205 A1 | 8/2019 | Jia et al. |
| 2019/0238680 A1 | 8/2019 | Narayanan et al. |
| 2019/0253553 A1 | 8/2019 | Chishti |
| 2019/0258825 A1 | 8/2019 | Krishnamurthy |
| 2019/0287517 A1 | 9/2019 | Green et al. |
| 2019/0295027 A1 | 9/2019 | Dunne et al. |
| 2019/0306315 A1 | 10/2019 | Portman et al. |
| 2019/0335038 A1 | 10/2019 | Alonso Y Caloca et al. |
| 2019/0341030 A1 | 11/2019 | Hammons et al. |
| 2019/0342450 A1 | 11/2019 | Kulkarni et al. |
| 2019/0349477 A1 | 11/2019 | Kotak |
| 2019/0377789 A1 | 12/2019 | Jegannathan et al. |
| 2019/0378076 A1 | 12/2019 | O'Gorman et al. |
| 2019/0385597 A1 | 12/2019 | Katsamanis et al. |
| 2019/0386917 A1 | 12/2019 | Malin |
| 2019/0392357 A1 | 12/2019 | Surti et al. |
| 2019/0394333 A1 | 12/2019 | Jiron et al. |
| 2020/0005375 A1 | 1/2020 | Sharan et al. |
| 2020/0007680 A1 | 1/2020 | Wozniak |
| 2020/0012697 A1 | 1/2020 | Fan et al. |
| 2020/0012992 A1 | 1/2020 | Chan et al. |
| 2020/0019893 A1 | 1/2020 | Lu |
| 2020/0028968 A1 | 1/2020 | Mendiratta et al. |
| 2020/0050788 A1 | 2/2020 | Feuz et al. |
| 2020/0050996 A1 | 2/2020 | Generes, Jr. et al. |
| 2020/0058299 A1 | 2/2020 | Lee et al. |
| 2020/0076947 A1 | 3/2020 | Deole |
| 2020/0097544 A1 | 3/2020 | Alexander et al. |
| 2020/0104801 A1 | 4/2020 | Kwon et al. |
| 2020/0118215 A1 | 4/2020 | Rao et al. |
| 2020/0119936 A1 | 4/2020 | Balasaygun et al. |
| 2020/0125919 A1 | 4/2020 | Liu et al. |
| 2020/0126126 A1 | 4/2020 | Briancon et al. |
| 2020/0128130 A1 | 4/2020 | Geary |
| 2020/0134492 A1 | 4/2020 | Copeland |
| 2020/0134648 A1 | 4/2020 | Qi et al. |
| 2020/0137097 A1 | 4/2020 | Zimmermann et al. |
| 2020/0154170 A1 | 5/2020 | Wu et al. |
| 2020/0160870 A1 | 5/2020 | Baughman et al. |
| 2020/0175478 A1 | 6/2020 | Lee et al. |
| 2020/0193335 A1 | 6/2020 | Sekhar et al. |
| 2020/0193983 A1 | 6/2020 | Choi |
| 2020/0211120 A1 | 7/2020 | Wang et al. |
| 2020/0218766 A1 | 7/2020 | Yaseen et al. |
| 2020/0219500 A1 | 7/2020 | Bender et al. |
| 2020/0242540 A1 | 7/2020 | Rosati et al. |
| 2020/0250272 A1 | 8/2020 | Kantor et al. |
| 2020/0250557 A1 | 8/2020 | Kishimoto et al. |
| 2020/0257996 A1 | 8/2020 | London |
| 2020/0280578 A1 | 9/2020 | Hearty et al. |
| 2020/0280635 A1 | 9/2020 | Barinov et al. |

(56) References Cited

U.S. PATENT DOCUMENTS

| | | |
|---|---|---|
| 2020/0285936 A1 | 9/2020 | Sen |
| 2020/0329154 A1 | 10/2020 | Baumann et al. |
| 2020/0336567 A1 | 10/2020 | Dumaine |
| 2020/0342868 A1 | 10/2020 | Lou et al. |
| 2020/0351375 A1 | 11/2020 | Lepore et al. |
| 2020/0351405 A1 | 11/2020 | Pace |
| 2020/0357026 A1 | 11/2020 | Liu et al. |
| 2020/0364507 A1 | 11/2020 | Berry |
| 2020/0365148 A1 | 11/2020 | Ji et al. |
| 2020/0380451 A1 | 12/2020 | Izadi |
| 2020/0395008 A1 | 12/2020 | Cohen et al. |
| 2020/0410506 A1 | 12/2020 | Jones et al. |
| 2021/0004536 A1 | 1/2021 | Adibi et al. |
| 2021/0005206 A1 | 1/2021 | Adibi et al. |
| 2021/0042839 A1 | 2/2021 | Adamec |
| 2021/0056481 A1 | 2/2021 | Wicaksono et al. |
| 2021/0067627 A1 | 3/2021 | Delker et al. |
| 2021/0073819 A1* | 3/2021 | Hernandez ......... G06Q 20/4016 |
| 2021/0081869 A1 | 3/2021 | Zeelig et al. |
| 2021/0081955 A1 | 3/2021 | Zeelig et al. |
| 2021/0082417 A1 | 3/2021 | Zeelig et al. |
| 2021/0082418 A1 | 3/2021 | Zeelig et al. |
| 2021/0084149 A1 | 3/2021 | Zeelig et al. |
| 2021/0089762 A1 | 3/2021 | Rahimi et al. |
| 2021/0090570 A1 | 3/2021 | Aharoni et al. |
| 2021/0091996 A1 | 3/2021 | Mcconnell et al. |
| 2021/0105361 A1 | 4/2021 | Bergher et al. |
| 2021/0124843 A1 | 4/2021 | Vass et al. |
| 2021/0125275 A1 | 4/2021 | Adibi |
| 2021/0133763 A1 | 5/2021 | Adibi et al. |
| 2021/0133765 A1 | 5/2021 | Adibi et al. |
| 2021/0134282 A1 | 5/2021 | Adibi et al. |
| 2021/0134283 A1 | 5/2021 | Adibi et al. |
| 2021/0134284 A1 | 5/2021 | Adibi et al. |
| 2021/0136198 A1 | 5/2021 | Leavitt et al. |
| 2021/0136204 A1 | 5/2021 | Adibi et al. |
| 2021/0136205 A1 | 5/2021 | Adibi et al. |
| 2021/0136206 A1 | 5/2021 | Adibi et al. |
| 2021/0201244 A1 | 7/2021 | Sella et al. |
| 2021/0201359 A1 | 7/2021 | Sekar et al. |
| 2021/0295237 A1 | 9/2021 | Taher et al. |
| 2021/0405897 A1 | 12/2021 | Hansalia |
| 2022/0114593 A1* | 4/2022 | Johnson ............ G06F 18/24133 |
| 2022/0114594 A1* | 4/2022 | Nunes ................ G06Q 20/4016 |
| 2022/0116415 A1* | 4/2022 | Burgis .................... H04L 67/51 |
| 2022/0122182 A1 | 4/2022 | Marshall et al. |
| 2022/0129905 A1 | 4/2022 | Sethumadhavan et al. |
| 2022/0398682 A1 | 12/2022 | Tam et al. |
| 2023/0007123 A1 | 1/2023 | Krucek et al. |
| 2023/0107335 A1* | 4/2023 | Garyani .............. H04L 63/1425 726/23 |

FOREIGN PATENT DOCUMENTS

| | | |
|---|---|---|
| SU | 1732352 A1 | 5/1992 |
| WO | 2006/037836 A1 | 4/2006 |
| WO | 2012/024316 A2 | 2/2012 |
| WO | 2015/099587 A1 | 7/2015 |
| WO | 2019142743 A1 | 7/2019 |

OTHER PUBLICATIONS

Aldor-Noiman, et al., "Workload forecasting for a call center: Methodology and a case study." The Annals of Applied Statistics 3.4 (2009); 1403-1447.

Buesing et al., "Getting the Best Customer Service from your IVR: Fresh eyes on an old problem," [online] McKinsey and Co., published on Feb. 1, 2019, available at: < https://www.nnckinsey.conn/business-functions/operations/our-insights/ getting-the-best-customer-service-from-your-ivr-fresh-eyes . . . (Year: 2019).

Chiu et al., "A multi-agent infrastructure for mobile workforce management in a service oriented enterprise", Proceedings of the 38th annual Hawaii international conference on system sciences, IEEE, 2005, pp. 10.

Data Warehousing in the Age of Big Data, Krishnan, 2013, Morgan Kaufmann, Chapter 5.

Diimitrios et al., "An overview of workflow management: From process modeling to workflow automation infrastructure," Distributed and parallel Databases, 1995, vol. 3, No. 2 pp. 119-153.

Ernst et al. "An Annotated Bibliography of Personnel Scheduling and Rostering", CSIRO Mathematical and Information Sciences, 2003, 155 pages.

Ernst et al., "Staff scheduling and rostering: A review of applications, methods and models," European Journal of Operational Research, 2004, vol. 153, pp. 3-27.

Federal Register, vol. 72, No. 195, Oct. 10, 2007, pp. 57526-57535.

Federal Register, vol. 75, No. 169, Sep. 1, 2010, pp. 53643-53660.

Federal register, vol. 79, No. 241 issued on Dec. 16, 2014, p. 74629, col. 2, *Gottschalk v. Benson*.

Federal Register, vol. 84, No. 4, Jan. 7, 2019, pp. 50-57.

Federal Register, vol. 84, No. 4, Jan. 7, 2019, p. 53-55.

Grefen et al., "A reference architecture for workflow management systems", Data & Knowledge Engineering, 1998, vol. 27, No. 1, pp. 31-57.

Huang et al., "Agent-based workflow management in collaborative product development on the Internet", Computer-Aided Design, 2000, vol. 32, No. 2, pp. 133-144.

Janarthanam, "Hands on Chatbots and conversational UI development: Build chatbots and voice user interfaces with Chatfuel, Dialogflow, Microsoft Bot Framework, Twilio, and Alexa Skills" Dec. 2017.

Koole, et al., "An overview of routing and staffing algorithms in multi-skill customer contact centers." 2006.

Myers et al., "At the Boundary of Workflow and AI", Proc. AAAI 1999 Workshop on Agent-Based Systems in The Business Context, 1999, 09 pages.

Niven, "Can music with prosocial lyrics heal the working world? A field intervention in a call center." Journal of Applied Social Psychology, 2015; 45(3), 132-138. doi:10.1111/jasp.12282 ).

On Hold Marketing, "Growing Your Business with Customized on-Hold Messaging" (Published on Apr. 5, 2018 at https://adhq.com/about/ad-news/growing-your-business-with-customized-on-hold-messaging) (Year: 2018).

U.S. Appl. No. 16/668,214, NFOA mailed Nov. 10, 2021.

U.S. Appl. No. 16/668,215, NFOA mailed Dec. 7, 2021.

Van Den Bergh et al. "Personnel scheduling: A literature review", European journal of operational research, 2013, vol. 226, No. 3 pp. 367-385.

United States Patent and Trademark Office, Non-Final Office Action for U.S. Appl. No. 16/550,961 mailed Mar. 2, 2020.

United States Patent and Trademark Office, Final Office Action for U.S. Appl. No. 16/550,961 mailed Jun. 17, 2020.

Gaietto, Molly., "What is Customer DNA?",—NGDATA Product News, Oct. 27, 2015, 10 pages.

Fan et al., "Demystifying Big Data Analytics for Business Intelligence Through the Lens of Marketing Mix", Big Data Research, vol. 2, Issue 1, Mar. 1, 2015, 16 pages.

Bean-Mellinger, Barbara., "What Is the Difference Between Marketing and Advertising?", available on Feb. 12, 2019, retrieved from https://smallbusiness.chron .com/difference-between-marketing-advertising-2504 7 .html, Feb. 12, 2019, 6 pages.

Twin, Alexandra., "Marketing", URL: https://www.investopedia.com/lerms/m/marketing.asp, Mar. 29, 2019, 5 pages.

dictionary.com, "Marketing", URL: https://www.dictionary.com/browse/marketing, Apr. 6, 2019, 7 pages.

Ponn et al., "Correlational Analysis between Weather and 311 Service Request Volume", eil.mie.utoronto.ca., Jan. 1, 2017, 16 pages.

Zhang et al., "A Bayesian approach for modeling and analysis of call center arrivals", Jan. 1, 2013 Winter Simulations Conference (WSC), ieeexplore.ieee.org, pp. 713-723.

Mehrotra et al., "Call Center Simulation Modeling: Methods, Challenges, and Opportunities", Proceedings of the 2003 Winter Simulation Conference, vol. 1, Jan. 1, 2003, pp. 135-143.

(56) References Cited

OTHER PUBLICATIONS

Mandelbaum et al., "Staffing Many-Server Queues with Impatient Customers: Constraint Satisfaction in Call Center", Operations Research, Sep.-Oct. 2009, vol. 57, No. 5 (Sep. 1-Oct. 2009), pp. 1189-1205.
Fukunaga et al., "Staff Scheduling for Inbound Call Centers and Customer Contact Centers", AI Magazine, Winter, vol. 23, No. 4, Jan. 1, 2002, pp. 30-40.
Feldman et al., "Staffing of Time-Varying Queues to Achieve Time-Stable Performance", Management Science, Feb. 1, 2008, vol. 54, No. 2, Call Center Management, pp. 324-338.
Business Wire, "Rockwell SSD announces Call Center Simulator", Feb. 4, 1997, 4 pages.
Nathan, Stearns., "Using skills-based routing to the advantage of your contact center", Customer Inter@ction Solutions, Technology Marketing Corporation, May 1, 2001, vol. 19 No. 11, pp. 54-56.
An et al, "Towards Automatic Persona Generation Using Social Media", Aug. 1, 2016, 2016 IEEE 4th International Conference on Future Internet of Things and Cloud Workshops (FiCloudW).
An, J., Kwak, H. and Jansen, B.J., ip.com, Nov. 2016. "Validating social media data for automatic persona generation", Abstract, In 2016 IEEE/ACS 13th International Conference of Computer Systems and Applications (AICCSA), 2 pages.
European Search Report in corresponding European Application No. 22178124 dated Oct. 20, 2022.

\* cited by examiner

METHOD AND APPARATUS FOR DETECTING ANOMALIES IN COMMUNICATION DATA

BACKGROUND

Contact centers, also referred to as "call centers", in which agents handle communications with customers based on agent skills and customer requirements, are well known. The term "customer", as used herein, can be any entity or individual contacting the contact center for information. FIG. 1 is an example system architecture of a cloud-based contact center system 100. Customers 110 interact with a contact center 150 using, for example, voice, email, text, and web interfaces to communicate with the agents 120 through a network 130 and at least one or more of text, voice or multimedia channels.

The agents 120 may be remote from the contact center 150 and handle communications (also referred to as "interactions" or "calls" herein) with customers 110 on behalf of an enterprise. The agents 120 may utilize devices, such as but not limited to, workstations, desktop computers, laptops, telephones, a mobile smartphone and/or a tablet. Similarly, customers 110 may communicate using a plurality of devices, including but not limited to, a telephone, a mobile smartphone, a tablet, a laptop, a desktop computer, or other. For example, telephone communication may traverse networks such as a public switched telephone networks (PSTN), Voice over Internet Protocol (VoIP) telephony (via the Internet), a Wide Area Network (WAN) or a Large Area Network (LAN). The network types are provided by way of example and are not intended to limit types of networks used for communications.

The agents 120 may be assigned to one or more queues representing call categories and/or agent skill levels. The agents 120 assigned to a queue may handle communications that are placed in the queue by the contact routing system 153. For example, there may be queues associated with a language (e.g., English or Chinese), topic (e.g., technical support or billing), or a particular country of origin. When a communication is received, the communication may be placed in a relevant queue, and eventually routed to one of the agents 120 associated with the relevant queue to handle the communication.

The contact center industry has been dealing with evermore customer data on a daily basis and what was once a blind interaction with the customer at the other end of the line is now a data enriched experience that is very valuable to the call center and users of the call center (i.e., entities for which communications from customers are received). Moreover, within the past few years, there has been a trend to eliminate dedicated physical call centers in favor of virtual platforms in which call center services are provided to users in the form of Software as a Service (SaaS). In such platforms, agents can be employees or contractors and can be located centrally or in a distributed manner. For example, agents can works from their homes on flexible schedules. Such platforms reduce overhead for the user and scalable and convenient service.

Although this disaggregation has advantages, as it allows user companies to grow their business without the need to manage their call center or provide space for call center agents, it also poses some issues and challenges. Security issues are of a primary concern. The distributed nature of the systems provides multiple attach points for hackers. Also, it is more difficult to ensure that agents adhere to proper security protocols. Service level is also a concern as it is more difficult to train and supervise agents. It is known to increase service and security by detecting specific occurrences in call center communications. Known techniques apply filters that are looking for specific terms to trigger and action. For example, if a customer communication includes the words such as "angry" or "dissatisfied", or phrases such as "cancel order", the communication can be escalated to a manager or other agent equipped better to deal with unhappy customers. While sometimes referred to as "anomaly detection", such techniques detect undesired activity but not necessarily anomalies. True anomaly detection of interactions in a call center requires a determination in substantially real time in view of a myriad of variables such as the subject matter of the call, times of day and year, the agent(s), call center user characteristics and domains, and the like. Current call center detection techniques do not provide the required speed and flexibility.

SUMMARY OF THE INVENTION

The disclosed implementations analyze agents' normal behavior and verify if there is any major change over time. This is often called anomaly detection and is very closely related to fraud detection. A first aspect of the invention is a method for creating a baseline database to be used to increase security in a call center implemented over a computing network by detecting anomalies in communication activities between call center agents and call center users, the method comprising: monitoring at least one stream of communication activity data indicating parameters of communication activities between call center agents and call center users; storing the communication activity data in a collected data database; aggregating the communication activity data into aggregated data; and creating, based on the aggregated data, at least one distribution of communication metrics over a period of time. A second aspect of the invention is a method for increasing security in a call center implemented over a computing network by detecting anomalies in communication activities between call center agents and call center users, the method comprising: monitoring event parameters of communication activities between call center agents and user; querying a baseline distribution database to determine that an event parameter represents a communication anomaly when the event parameter indicates an event that corresponds to a probability that is lower than a predetermined threshold probability and a calculated confidence of the event is higher than a predetermined confidence threshold, wherein the baseline distribution database is created by monitoring at least one stream of communication activity data indicating parameters of communication activities between call center agents and call center users, storing the communication activity data in a collected data database and aggregating the communication activity data to create at least one distribution of communication metrics over a period of time; and storing a record of the communication anomaly in and anomaly database.

A third aspect of the invention is a system for creating a baseline database to be used to increase security in a call center implemented over a computing network by detecting anomalies in communication activities between call center agents and call center users, the system comprising: at least one memory storing computer executable instructions; and at least one processor which, when executing the instructions accomplishes the method of: monitoring at least one stream of communication activity data indicating parameters of communication activities between call center agents and call center users; storing the communication activity data in a collected data database; aggregating the communication activity data into aggregated data; and creating based on the aggregated data, at least one distribution of communication metrics over a period of time.

A fourth aspect of the invention is a system for increasing security in a call center implemented over a computing network by detecting anomalies in communication activities between call center agents and call center users, the system comprising: at least one memory storing computer executable instructions; and at least one processor which, when executing the instructions accomplishes the method of: monitoring event parameters of communication activities between call center agents and user; querying a baseline distribution database to determine that an event parameter represents a communication anomaly when the event parameter indicates an event that corresponds to a probability that is lower than a predetermined threshold probability and a calculated confidence of the event is higher than a predetermined confidence threshold, wherein the baseline distribution database is created by monitoring at least one stream of communication activity data indicating parameters of communication activities between call center agents and call center users, storing the communication activity data in a collected data database and aggregating the communication activity data to create at least one distribution of communication metrics over a period of time; and storing a record of the communication anomaly in and anomaly database

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

Figure 1:
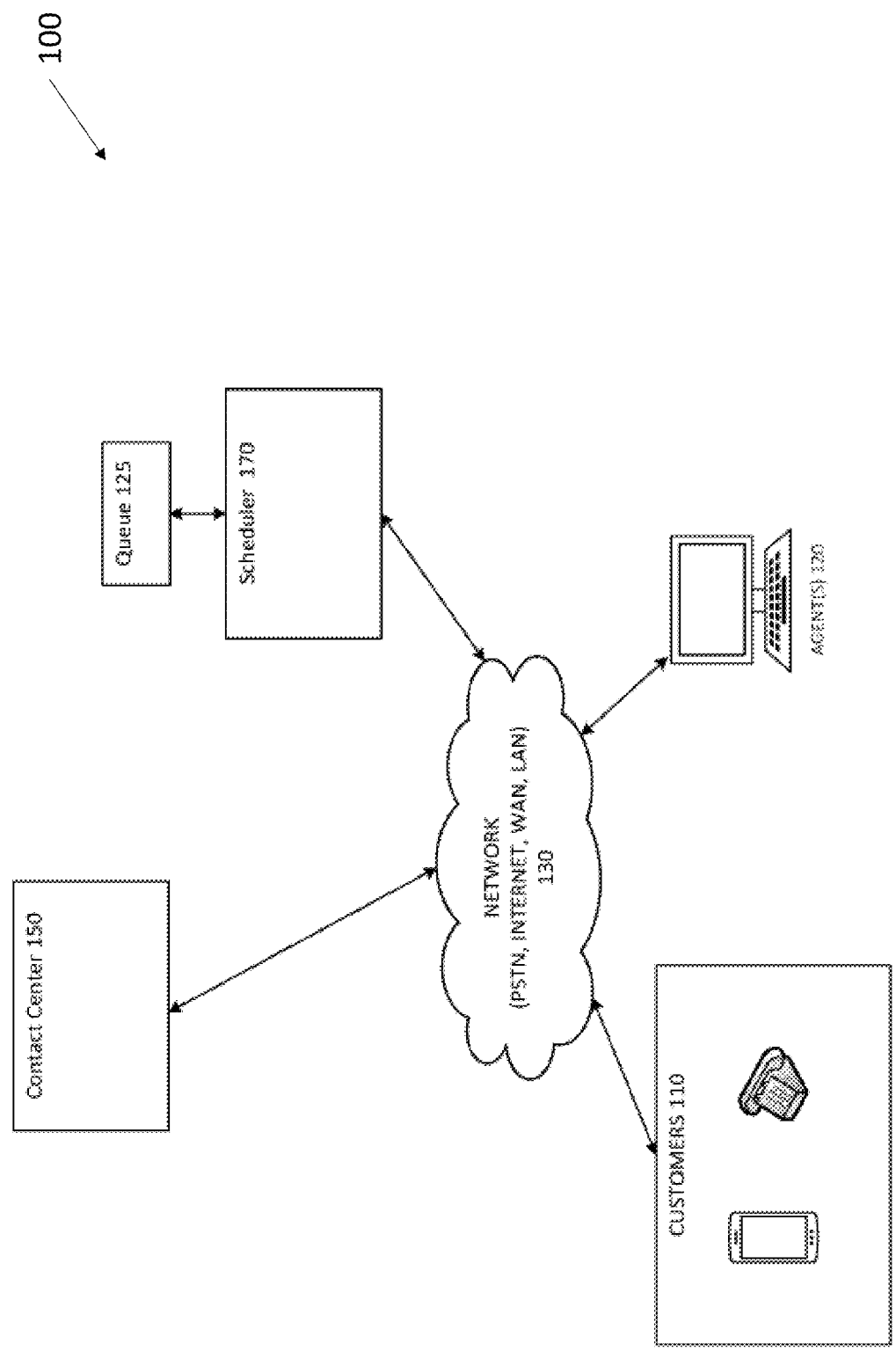
FIG. 1 is an architectural diagram of a conventional cloud based contact center computing environment.
Figure 2:
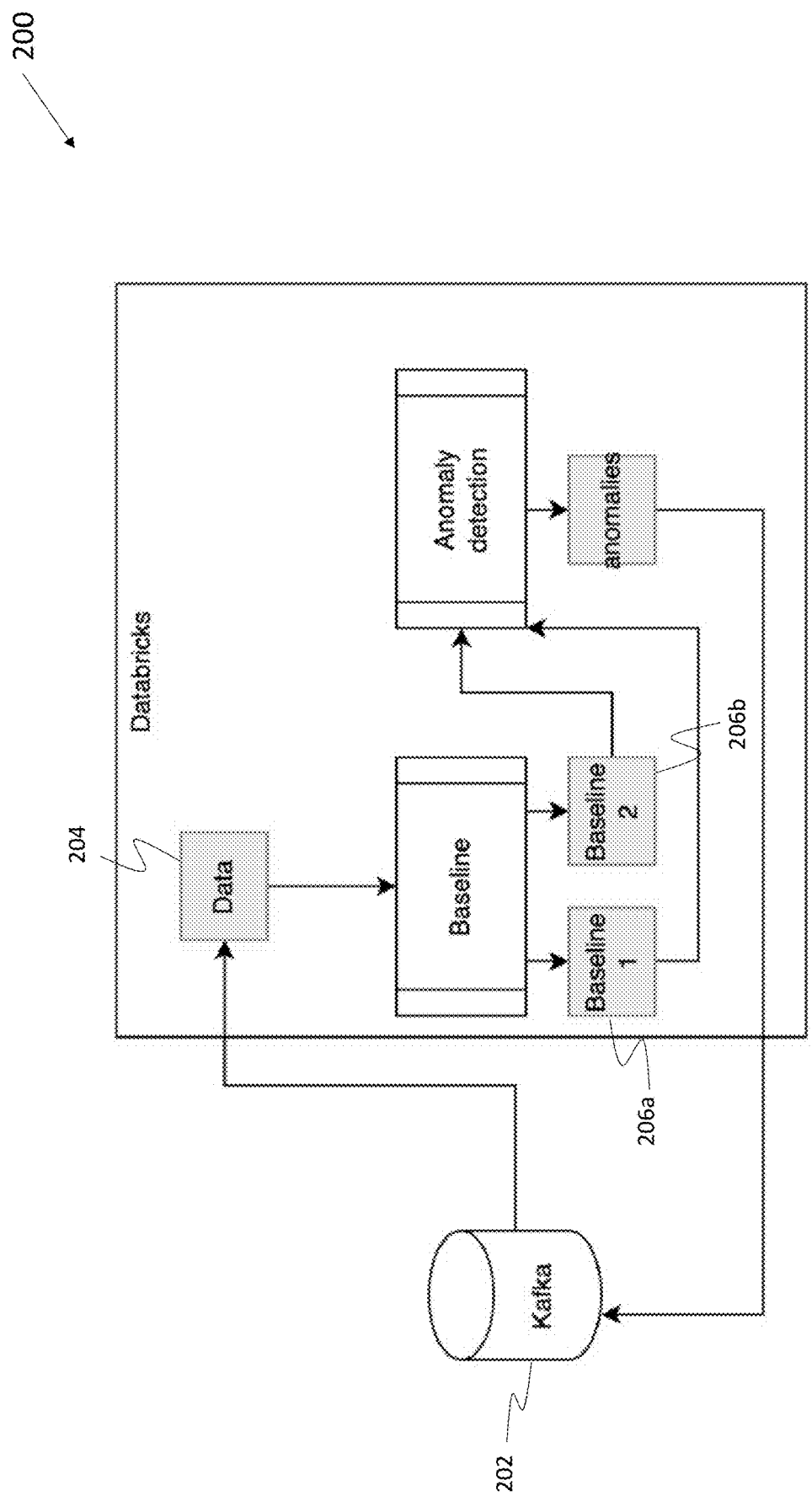
FIG. 2 is a block diagram an architecture and data flow of system for anomaly detection in a call center in accordance with disclosed implementations.

FIG. 2 illustrates an architecture of call center anomaly detection system 200 in accordance with disclosed implementations. System 200 is a hybrid model which consumes data as streams from database 202, a Kafka database in this example, and processes that data in both streaming and batch. Apache Kafka™ is an event streaming database platform capable of a high volume of events. In this example, Databricks was used provide flexibility in programming languages and connections to other systems. Databricks™ is a cloud-based data environment that is capable of processing and transforming large quantities of data. through, for example, Machine Learning models.

Communications, between agents and customers for example, are monitored and data streams representing the communications are stored in database 202. This data is then processed by data module 204. Data module 204 can aggregate and segregate the data in various manners as described in more detail below. Baseline module 206 then applies distribution algorithms to produces one or more baseline probability distributions. A probability distribution is a known statistical function that describes all the possible values and likelihoods that a random variable can take within a given range. Plotting of a baseline value (or multiple values) on the probability distribution can be based on a number of factors. These factors include the distribution's mean, standard deviation, skewness, and kurtosis. Data module 204 can create various distributions as needed. For example, distributions can correspond to specific agents, call centers, type of communication, and the like, or any combination thereof.

Figure 3:
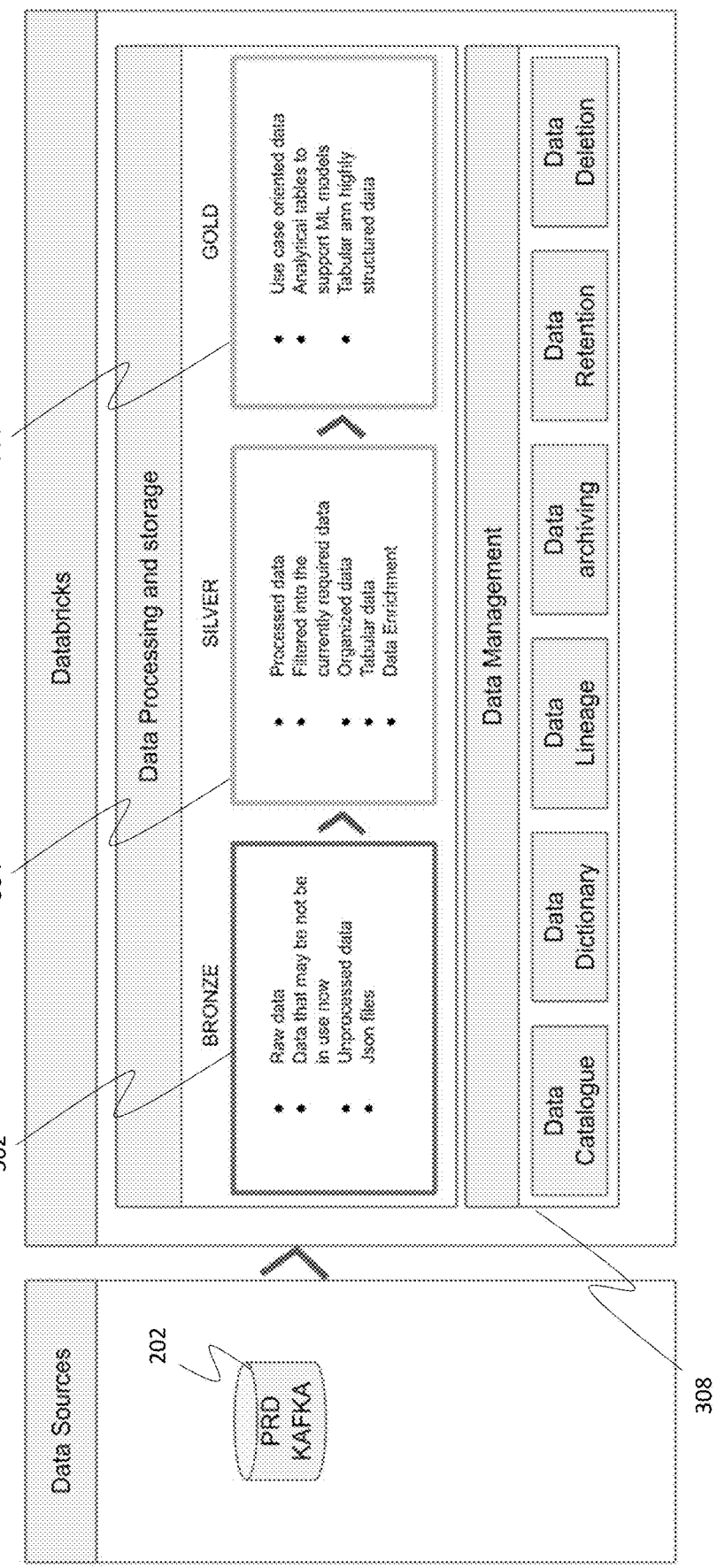
FIG. 3 illustrates data model that can be used as the basis for anomaly detection in accordance with disclosed implementations.

The anomaly detection system of disclosed embodiments takes raw data relating to communications and provides valuable insights through fast and reliable anomaly detection. FIG. 3 illustrates data model 300 that can be used as the basis for anomaly detection. Within the Databricks environment data can be consumed and stored into three different layers (referred to as "bronze", "silver", and "gold" layers herein). Bronze layer 302 holds the raw data, that may or may not be used immediately or at a later time for some other use cases. Silver layer 304 holds processed and filtered data that enables the creation of the baseline distributions which will be the used for anomaly detection. Gold layer 306 is focused on delivering valuable insights and consists of immutable or less mutable data while setting up support for advanced use cases related to anomaly detection. The data in each data layer is described in more detail below.

Data management layer 308 can include 6 modules define a set of policies or a way to trace data back to its origin:
  Data Catalogue Module—A catalog on what data is being processed from the database and the data being generated to be consumed by other modules;
  Data Dictionary Module—A detailed dictionary on every table and field within silver and gold data layers;
  Data Lineage Module—Lineage is used to trace back results to origin and know exactly which processes originated the results, where it has consumed data and what data;
  Data Archiving Module—Archiving policies define when, where, what and why data should be archived;
  Data Retention Module—Data retention policies define how much time data needs to be stored in each table and S3 bucket discussed below;
  Data Deletion Module—Data deletion policies define when, what and why data needs to be deleted, as well as it keeps record of what data was deleted, by whom and why.

The data management policies, catalog and dictionary can correspond to best practices and data engineering guidelines so that the data model can be scaled.

Any database management system can be used. However, in FIGS. 2 and 3 one Kafka database 202 illustrated. Data can be streamed to database 202 from various data sources, including:

Audit logs—provides information relating to agents' interactions, such as login and logouts, password changes or resets, authentication methods updates, and contact reads;

Calls—gives insights into the type of calls agents are performing, like inbound and outbound calls, missed calls, call initiated or finished;

Agents—provides information on updates done to agents' accounts, as when an agent account is created, deleted, activated or deactivated, as well as agent profile updates;

Accounts—shows when a client account was created, deleted, or updated;

Presence—indicates the agent's current status and when the status was altered (for example when the agent is online and becomes away, in a call, offline, or any of the other statuses that are available for the account the agent belongs to);

Call quality—gives an overview of the call quality of each agent;

Teams—incorporates updates, creation, and deletion of teams of agents;

Recordings—provides data on what call or screen recordings were accessed by whom;

Voice metrics—holds data concerning the quality of speech during calls, concerning the number of decibels and overall mood of the conversation.

The disclosed implementations for performing anomaly detection can be split into three main parts: (1) data ingestion into the data model; (2) creation of behavioral baselines; and (3) detecting anomalies on current data. Regardless of the original data source, data is ingested from database 202 (Kafka or another database) into bronze layer 302, which can be in the form of Amazon S3 buckets for example, for long-term storage. The data can be filtered and/or enriched for the events that need to be processed. This data can then be stored in delta tables within Databricks. All this can happen in streaming and data can be made available within the delta tables substantially in real-time, e.g., immediately after it is ingested by the Databricks processes.

Gold layer 306 is composed of processes that run in batches and fetch data from tables in silver layer 304 that pragmatically cannot be processed in streaming. One example of data in silver layer 304 is data related to sessions, where the session start event is processed long before the session end event, and therefore, the process cannot be waiting indefinitely. The baseline distributions can be created periodically (for example, once every day in batch at 00:05 UTC with 30 days of aggregated data from either silver and gold tables or other existing baselines). Data is aggregated by both agent and account per peer per day, in a predefined time period (for example, starting 31 days before the current UTC time and finishing 1 day before the current UTC time.

The baseline distributions can be composed of the four tables which are, for example:

Table 1—baseline per user per day;
Table 2—baseline per peers per day;
Table—baseline per details per user per day;
Table 4—baseline per details per peer per day.

The first table holds the aggregated metrics per agent, account, and day. The second, stores per account and day. So, these two tables have the aggregated baseline metrics per day, in either the agent or account level. The third and fourth tables have detailed information for either the agent or the account for each use case. Both baselines provide a different level/aspect of understanding from the agent perspective and the account perspective that can be used for calculating anomalies.

The following is an example situation illustrating a possible anomaly. An account is based in the US, so the agents usually log in from the US. However, the agent (who may be a remote contractor) has moved to France and is now logging in from there. The baseline for the agent will be the number of different countries that the login was made from. In this case, the number of different countries is 2 (U.S. and France) and will be stored in table 1 described above. In table 2, the baseline for the account, which is calculated considering all the agents in this account, will also store 2 as the number of countries from which the agents logged in (since all agents logged from the US and there was 1 agent that logged in from the US and then from France). Table 3 will store 2 records: (1) a record reflecting that a particular agent logged in from the US; (2) a record reflecting that this same particular agent has logged in from France. In table 4, there will be also 2 records: (1) a record that reflects the number of agents logged in from the US, which will be the total number of agents for the account; and (2) a record reflecting the number of agents logged in from France (in this example, 1).

As another example, a statistical distribution of a number of calls received from set of regions around the world per hour for a customer can be created and approximated as a Gaussian or some quasi-Gaussian distribution for instance. Then the probability of number of calls in each hour for each region is computed based on the corresponding distributions. A trigger can be actuated when the number of calls exceeds a threshold (computed as a function of the mean and first-order deviation from the distribution, for example). This technique can be used to identify unusual call volumes during hours where the expected numbers are within a range (as defined by the distribution).

Assume that the anomaly detection processes run every 10 minutes, aggregating data from that day and comparing it to the existing baselines for both users and peers. When a value is outside the norm or baseline distribution, an anomaly is detected and an anomaly message is triggered. For example, an anomaly message can be triggered specifying that the agent has made 20 outbound calls in a day when usually it only makes about 10 outbound calls in a day. However, the agents peers normally make about 19 outbound calls a day, so a particular agent making 20 outbound calls will not be completely out of the norm. Therefore, although an anomaly is detected for that particular agent, it is not an anomaly with respect to agents overall since the peers usually make about 19 outbound calls. Rules can be applied to determine an anomaly message based on which type(s) of anomalies have been detected.

Data in each layer can be processed and combined to cerate data streams for a subsequent layer in the workflow. The following table defines examples of the streams that can be used/generated in disclosed implementations:

|  | ID | Origin data | Source system | Source Layer | Destination data | Destination system | Destination Layer | Description |
|---|---|---|---|---|---|---|---|---|
| First Level | 1 | event-splitter.audit_logs | kafka | Data source | bronze_audit_logs | delta | bronze | Data comes from Kafka, is then passed and stored within bronze tables |
|  | 2 | event-splitter.calls | kafka | Data source | bronze_calls | delta | bronze |  |
|  | 3 | event-splitter.agents | kafka | Data souce | bronze_agents | delta | bronze |  |

-continued

| | ID | Origin data | Source system | Source Layer | Destination data | Destination system | Destination Layer | Description |
|---|---|---|---|---|---|---|---|---|
| | 4 | event-splitter.teams | kafka | Data source | bronze_teams | delta | bronze | |
| | 5 | event-splitter.account | kafka | Data source | bronze_accounts | delta | bronze | |
| | 6 | brokkr.historical-calls | kafka | Data source | bronze_historical_calls | delta | bronze | |
| | 7 | broker.explore.agent-status-monthly-v3 | kafka | Data source | bronze_broker_agent_status | delta | bronze | |
| Second Level | 8 | bronze_audit_logs | delta | bronze | silver_audit_logs_contact_read | delta | silver | Data from bronze_audit_logs and is filtered into silver delta tables |
| | 9 | | | | silver_audit_logs_create_interaction_recording | delta | silver | |
| | 10 | | | | silver_audit_logs_delete_interaction_recording | delta | silver | |
| | 11 | | | | silver_audit_logs_list_interaction_recording | delta | silver | |
| | 12 | | | | silver_audit_logs_on_recording_update_event | delta | silver | |
| | 13 | | | | silver_audit_logs_read_call_recordings | delta | silver | |
| | 14 | | | | silver_audit_logs_read_recording_media_file | delta | silver | |
| | 15 | | | | silver_audit_logs_update_interaction_recording | delta | silver | |
| | 16 | | | | silver_audit_logs_user_authentication_settings_updated | delta | silver | |
| | 17 | | | | silver_audit_logs_user_login_attempt | delta | silver | |
| | 18 | | | | silver_audit_logs_user_password_changed | delta | silver | |
| | 19 | | | | silver_audit_logs_user_password_reset | delta | silver | |
| | 20 | | | | silver_audit_logs_user_session_created | delta | silver | |
| | 21 | | | | silver_audit_logs_user_session_revoked | delta | silver | |
| | 22 | bronze_calls | delta | bronze | silver_calls_agent_call_answered | delta | silver | |
| | 23 | | | | silver_calls_agent_call_cancelled | delta | silver | |
| | 24 | | | | silver_calls_agent_call_finished | delta | silver | |
| | 25 | | | | silver_calls_agent_call_initiated | delta | silver | |
| | 26 | | | | silver_calls_call_agents_batch_dialed | delta | silver | |
| | 27 | | | | silver_calls_call_answered | delta | silver | |
| | 28 | | | | silver_calls_call_billed | delta | silver | |
| | 29 | | | | silver_calls_call_dialer_billed | delta | silver | |
| | 30 | | | | silver_calls_call_external_answered | delta | silver | |
| | 31 | | | | silver_calls_call_external_initiated | delta | silver | |
| | 32 | | | | silver_calls_call_finished | delta | silver | |
| | 33 | | | | silver_calls_call_initiated | delta | silver | |
| | 34 | | | | silver_calls_call_missed | delta | silver | |
| | 35 | | | | silver_calls_csat_sent | delta | silver | |
| | 36 | | | | silver_calls_outgoing_call_answered | delta | silver | |
| | 37 | | | | silver_calls_outgoing_call_finished | delta | silver | |
| | 38 | | | | silver_calls_outgoing_call_initiated | delta | silver | |
| | 39 | | | | silver_calls_outgoing_call_missed | delta | silver | |

-continued

| | ID | Origin data | Source system | Source Layer | Destination data | Destination system | Destination Layer | Description |
|---|---|---|---|---|---|---|---|---|
| | 40 | bronze_agents | delta | bronze | silver_agents_agent_activated | delta | silver | |
| | 41 | | | | silver_agents_agent_created | delta | silver | |
| | 42 | | | | silver_agents_agent_deactivated | delta | silver | |
| | 43 | | | | silver_agents_agent_deleted | delta | silver | |
| | 44 | | | | silver_agents_agent_status_changed | delta | silver | |
| | 45 | | | | silver_agents_agent_updated | delta | silver | |
| | 46 | | | | silver_agents_presence_updated | delta | silver | |
| | 47 | bronze_teams | delta | bronze | silver_teams_system_remove_members_from_team | delta | silver | |
| | 48 | | | | silver_teams_user_add_member_to_team | delta | silver | |
| | 49 | | | | silver_teams_user_create_team | delta | silver | |
| | 50 | | | | silver_teams_user_delete_team | delta | silver | |
| | 51 | | | | silver_teams_user_remove_members_from_team | delta | silver | |
| | 52 | | | | silver_teams_user_update_team | delta | silver | |
| | 53 | bronze_historical_calls | delta | bronze | silver_historical_calls_call_finished | delta | silver | |
| Third Level | 54 | user_session_created | delta | silver | gold_all_sessions | delta | gold | Data from delta tables is combined into gold delta tables. Extensive ETL processing will be in place here |
| | 55 | user_session_revoked | delta | silver | | | | |
| | 56 | user_session_created | delta | silver | gold_closed_sessions | delta | gold | |
| | 57 | user_session_revoked | delta | silver | | | gold | |
| | 58 | gold_users | delta | silver | | delta | gold | |

Figure 4:
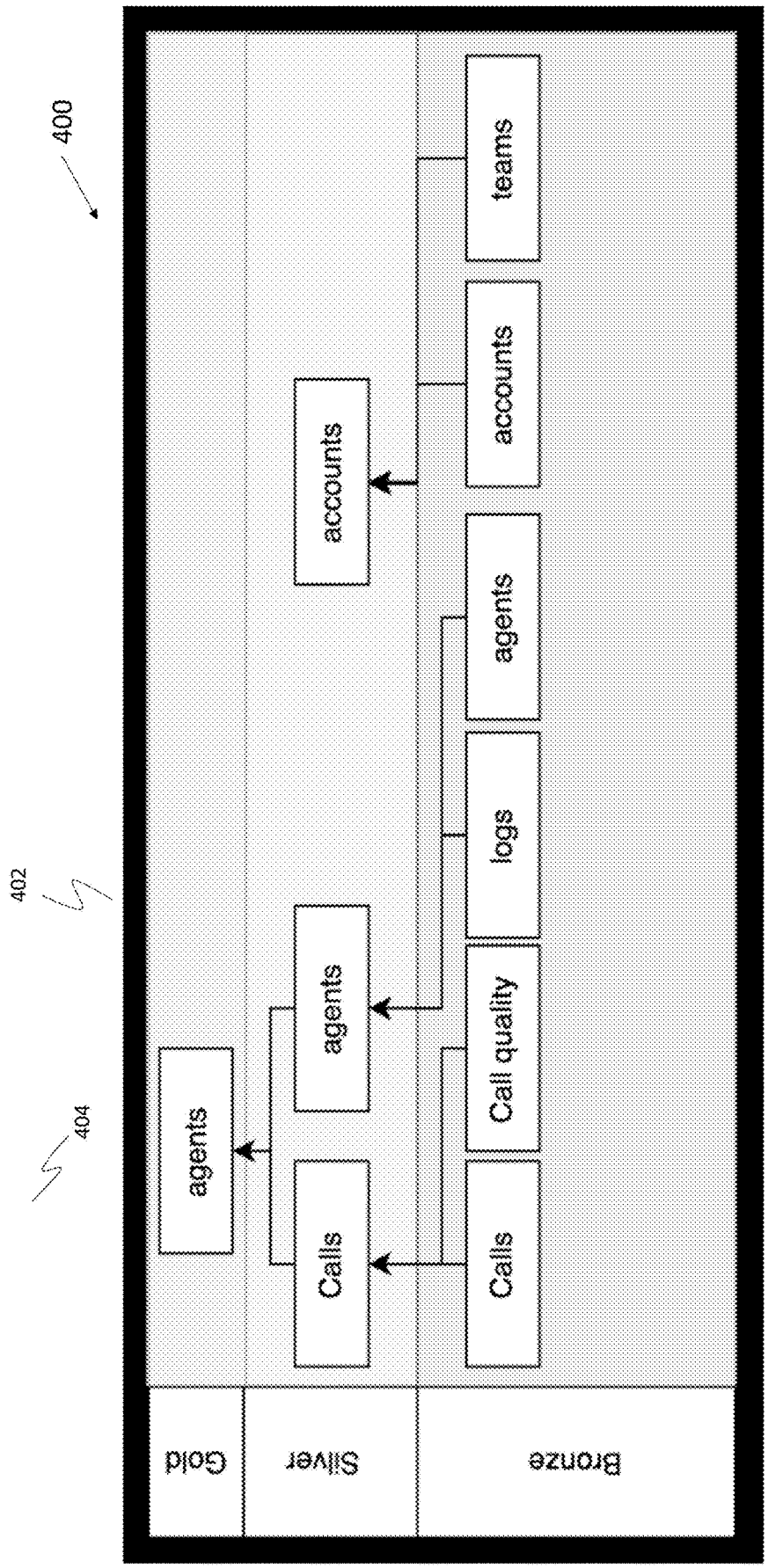
FIG. 4 illustrates an example of a data aggregation ontology in accordance with disclosed implementations.

FIG. 4 illustrates a data aggregation ontology according to an example of disclosed implementations. As discussed above, data in accordance with the data model is organized in bronze layer 302, silver layer 304 and gold layer 306. The baselines in bronze layer 302 represent the basic aggregations that store the information processed from the data sources available, such as:
calls;
call quality;
logs;
agents;
accounts;
teams.

Silver layer 304 represents aggregations performed over bronze baselines, which means that the aggregations in silver layer 304 can be composed of:
calls—that combine calls and call quality;
agents—that combine logs and agents;
accounts—that combine accounts and teams.
The gold layer provides overall aggregations of the silver baselines.

Anomaly detection

Figure 5:
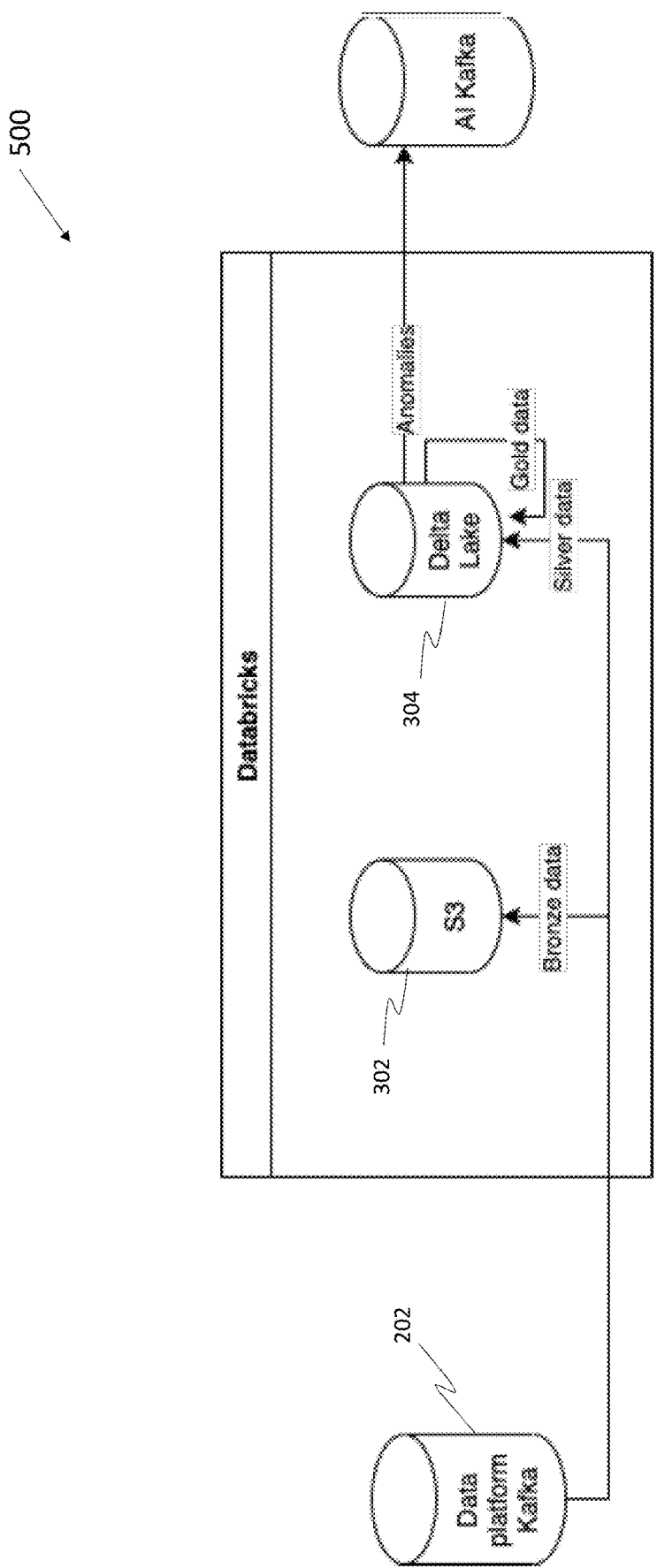
FIG. 5 illustrates and example of a data workflow in accordance with disclosed implementations.

FIG. 5 illustrates data workflow 500 in accordance with an example of disclosed implementations. Elements in FIG. 5 that are the same as, or similar to, those in FIG. 3 are labeled with like reference numerals. After, being collected and stored in database 202, data is sourced from database 202 and streamed into bronze layer 302, which is an S3 database in this example. The same data stream is parsed and filtered to tables in silver layer 304, which is a Delta Lake in this example. Amazon Simple Storage Service (Amazon S3)™ is an object storage service. Delta Lake is an open source storage layer. Tables in silver layer 304 are processed to agregrate/transform data from silver layer 304 into tables of gold layer 306. Anomalies are calculated within the Databricks environment and then synched into AI Kafka. This creates a messaging queue that is used to transport the output of anomaly detection to the client applications for various purposes such as inference/detection.

In Apache Kafka, categories used to organize messages are called "topics". Each topic should have a name that is unique across the entire Kafka cluster. Messages can be sent to, and read from, specified topics. Kafka topics can have zero or more "consumers" subscribing to that topic and the data written to it. Topics can be partitioned and replicated throughout the implementation. As an example, the disclosed implementations can process the following topics:
event-splitter. audit_logs—all data related to logs (session create, session revoke, etc)
event-splitter.calls—all data related to calls (call started, call finished, call billed, etc)
event-splitter.agents—all data related to agents (agent created, agent removed, etc)
event-splitter.accounts—all data related to accounts (account created, account updated, etc)
brokkr.explore.agent-status-monthly-v3—all data related to agent status updated (agent online, etc)

The anomaly detection process can include two main steps. The first step is to create the baseline of normal behavior and the second is to compare the current behavior to the baselines and check for anomalies. Thee baselines can be divided into several types, such as "session baselines"

and "call baselines". The sessions baselines can include four different tables calculated all within the same data pipeline.

silver_agents_sessions_baseline_user_details_day—contains the aggregation of each case per user silver_agents_sessions_baseline_peer_details_day—contains the aggregation of each case account silver_agents_sessions_baseline_user_day—pivots the cases for columns and aggregates data so each row is a unique combination of the cases, account, user and respective role silver_agents_sessions_baseline_peer_day—pivots the cases for columns and aggregates data so each row is a unique combination of the cases and account After creating these tables, the tables can be updated periodically, such as once per day, and used as the baselines of every account/user/use case for a predefined period of time, such as 30 days. The current day's data can then be run against, e.g., compared to, the baselines. A predetermined divergence form the baseline can be detected as an anomaly.

The calls baselines create the baselines for a user and peers and can include the following tables:

silver_agents_calls_baseline_user_details—This table can include the number of distinct countries per agent phone number or customer phone number per user in the last 30 days silver_agents_calls_baseline_peer_details—This table can include the number of distinct countries per agent phone number or customer phone number per account in the last 30 days silver_agents_calls_baseline_user_day—This table can include the call metrics per user and day silver_agents_calls_baseline_peer_day—This table can include the call metrics per account and day As noted above, the baselines process can run periodically to aggregates current data for the day and compare that data with the baselines. If the current data is different from the baselines in a predetermined manner, then an anomaly is detected, written to the nr_anomalies table and to AI Kafka into a topic, such as ai-guardian.nr_anomalies.

The disclosed implementations use baseline distributions as support for anomaly creation, which means that periodically a smaller baseline is created using the same query for the current day per agent and then compares the results to the matching baseline. The following categories can be used for aggregations of data and baselines:

Logs

Agent sessions—The number of sessions of this agent increased;

Agent IPs—The number of IP addresses used by this agent has grown;

Agent countries—Higher agent login related activity by country;

Agent browser—The number of browsers used by this agent has grown;

Agent operating systems—The number of operating systems used by this agent has grown;

Calls

Inbound calls—The user has a different number of inbound calls;

Outbound calls—User has a different number of outbound calls;

Calls for the same number—The user has made a different number of calls to the same number. As the number of calls performed or answered is often used as a metric to evaluate the agent, calling the same number many times is considered gaming the system which is something that we want to detect.

The anomaly detection algorithm is based on the calculation of the probability of a certain type of event to happen based on baselines. For each use case, the probability distributions of the event to occur is calculated in the baselines for both each agent or the agent's peers. A probability model is a mathematical representation of a random phenomenon. It is defined by its sample space, events within the sample space, and probabilities associated with each event. The sample space S for a probability model is the set of all possible outcomes. Various probability models can be used to determine the probability distributions. for example, binomial distribution, Poisson distribution, normal distribution, and/or bivariate normal distribution probability models can be used.

A low probability indicates that the event is unlikely to occur. Therefore, the anomaly is actually ranked higher. Together with the probability, it is helpful to also consider the confidence that the use case is actually an anomaly. So, the anomaly detection algorithm cand use a combination of probability and confidence thresholds to analyze the anomaly. For example, anomalies can be persisted (detected) only when the probability is low, less than, for example, 0.05, and the confidence is high, above, for example, 0.85. The stream processing and use of multiple probabilistic baselines, as disclosed herein allows the disclosed implementations to reliably detect call center anomalies in a meaningful manner is substantially real-time.

Figure 6:
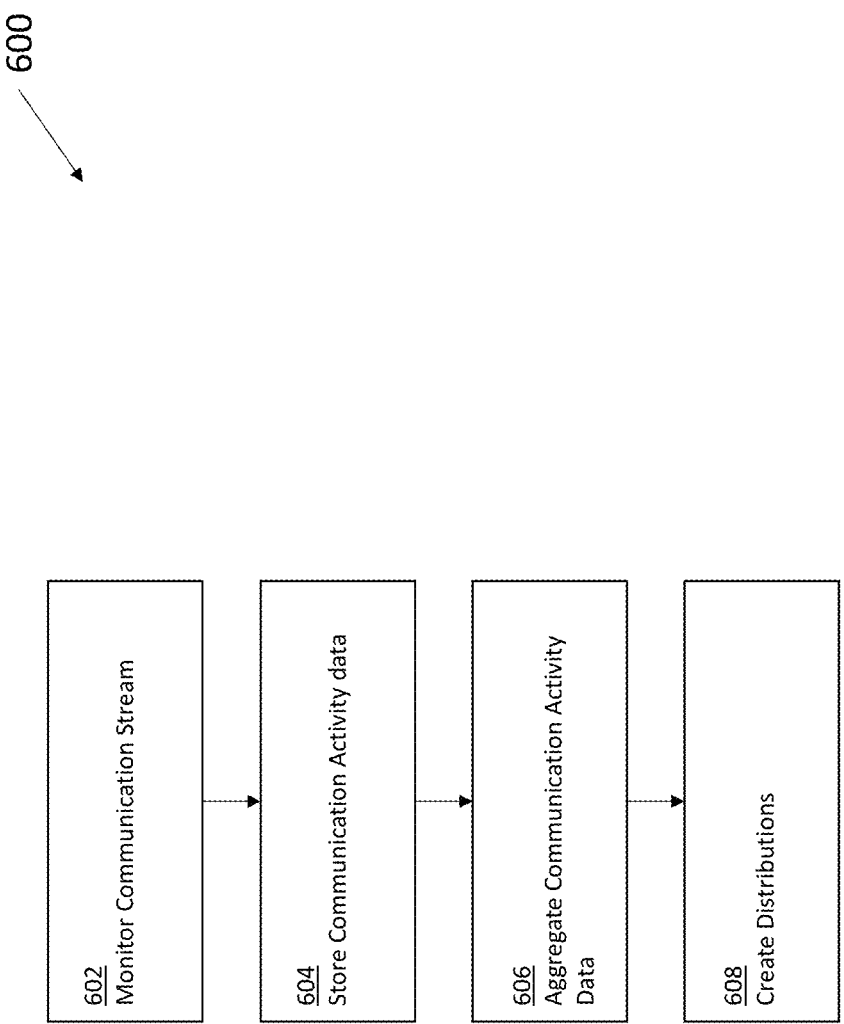
FIG. 6 is a flow chart of process for creating distributions for use in anomaly detection in accordance with disclosed implementations.

FIG. 6 is a flow chart of a process for creating distributions in accordance with disclosed implementations. Process 600 starts at 602 by monitoring at least one stream of communication activity data indicating parameters of communication activities between call center agents and call center users. At 604, the communication activity data is stored in a database. At 606, the data is aggregated and at 508 distributions are created based on the aggregated data. The distributions can include an agent baseline distribution of communication metrics for each of the agents per day and a peer baseline distribution of communication metrics for at least one group of the agents per day.

Figure 7:
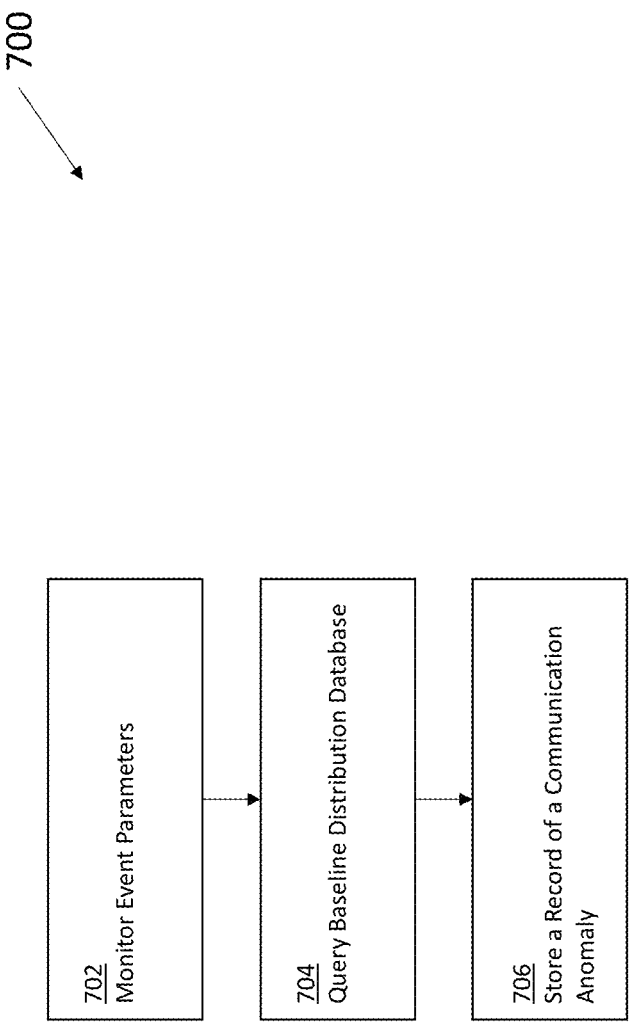
FIG. 7 is a flow chart of process for creating distributions for use in anomaly detection in accordance with disclosed implementations.

FIG. 7 is a flow chart of a process for detecting anomalies in accordance with disclosed implementations. Process 700 begins at 702 by monitoring event parameters of communication activities between call center agents and user. At 04, a baseline distribution database is queried to determine that an event parameter represents a communication anomaly when the event parameter indicates an event that corresponds to a probability that is lower than a predetermined threshold probability and a calculated confidence of the event is higher than a predetermined confidence threshold, wherein the baseline distribution database is created by monitoring at least one stream of communication activity data indicating parameters of communication activities between call center agents and call center users, storing the communication activity data in a collected data database and aggregating the communication activity data to create an agent baseline distribution of communication metrics for each of the agents per day and a peer baseline distribution of communication metrics for at least one group of the agents per day. At 706, a record of the communication anomaly is stored in and anomaly database.

The baselines can be refreshed on a schedule. Further personalized (e.g., customer-level or industry-level) baselines can be created to facilitate multi-level anomaly detection. For example, an observation could be an outlier at the customer-level but not for the industry. In such a case a trigger rule can be applied to detect (or not detect) and anomaly. Baselines can be multiple and dynamic, and continuously updated to accommodate holidays, supply chain disruptions, and the like. The disclosed implementations leverage distributional techniques to compute probability of an observation to be an outlier based on the computed baselines. Complex observations can be modeled using correlation based techniques using high-dimensional data.

A given computing platform may include one or more processors configured to execute computer program modules. The computer program modules associated with the computing platform allow the computing platform to provide the functionality disclosed herein. Computing platforms may include electronic storage, one or more processors, and/or other components, such as communication lines, or ports to enable the exchange of information with a network and/or other computing platforms. Electronic storage devices may comprise non-transitory storage media that electronically stores information. Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store software algorithms, information determined by processor(s) and/or other information that enables server(s) 202 to function as described herein.

Processor(s) may be configured to provide information processing capabilities and may include one or more of a digital processor, an analog processor, a digital circuit designed to process information, an analog circuit designed to process information, a state machine, and/or other mechanisms for electronically processing information. As used herein, the term "module" may refer to any component or set of components that perform the functionality attributed to the module. This may include one or more physical processors during execution of processor readable instructions, the processor readable instructions, circuitry, hardware, storage media, or any other components.

It will be appreciated by those skilled in the art that changes could be made to the embodiments described above without departing from the broad inventive concept thereof. It is understood, therefore, that this invention is not limited to the particular implementations disclosed, but it is intended to cover modifications within the spirit and scope of the present invention as defined by the appended claims.

What is claimed:

1. A method for increasing security in a call center implemented over a computing network by detecting anomalies in communication activities between call center agents and call center users, the method comprising:
monitoring event parameters of communication activities between call center agents and user;
querying a baseline distribution database to determine that an event parameter represents a communication anomaly when the event parameter indicates an event that corresponds to a probability that is lower than a predetermined threshold probability and a calculated confidence of the event is higher than a predetermined confidence threshold, wherein the baseline distribution database is created by monitoring at least one stream of communication activity data indicating parameters of communication activities between call center agents and call center users, storing the communication activity data in a collected data database and aggregating the communication activity data to create at least one distribution of communication metrics over a period of time; and
storing a record of the communication anomaly in an anomaly database.

2. The method of claim 1, wherein at least one stream of communication activity data includes at least one of event audit logs, communication events, account information, and agent status data.

3. The method of claim 2, further comprising creating use case specific tables and analytics based on the communication activity data.

4. The method of claim 1, wherein the at least one distribution includes an agent baseline distribution of communication metrics for each of the agents per day and a peer baseline distribution of communication metrics for at least one group of the agents per day.

5. The method of claim 1, wherein the at least one stream of communication data includes direct data about communications and derived data about communications.

6. A system for increasing security in a call center implemented over a computing network by detecting anomalies in communication activities between call center agents and call center users, the system comprising:
at least one memory storing computer executable instructions; and
at least one processor which, when executing the instructions accomplishes the method of:
monitoring event parameters of communication activities between call center agents and user;
querying a baseline distribution database to determine that an event parameter represents a communication anomaly when the event parameter indicates an event that corresponds to a probability that is lower than a predetermined threshold probability and a calculated confidence of the event is higher than a predetermined confidence threshold, wherein the baseline distribution database is created by monitoring at least one stream of communication activity data indicating parameters of communication activities between call center agents and call center users, storing the communication activity data in a collected data database and aggregating the communication activity data to create at least one distribution of communication metrics over a period of time; and
storing a record of the communication anomaly in an anomaly database.

7. The system of claim 6, wherein at least one stream of communication activity data includes at least one of event audit logs, communication events, account information, and agent status data.

8. The system of claim 7, wherein the method further comprises creating use case specific tables and analytics based on the communication activity data.

9. The system of claim 6, wherein the at least one distribution includes an agent baseline distribution of communication metrics for each of the agents per day and a peer baseline distribution of communication metrics for at least one group of the agents per day.

10. The system of claim 6, wherein the at least one stream of communication data includes direct data about communications and derived data about communications.

* * * * *